US011794930B1

(12) United States Patent
McGann et al.

(10) Patent No.: US 11,794,930 B1
(45) Date of Patent: *Oct. 24, 2023

(54) UNMANNED AERIAL VEHICLE JETTISON APPARATUS

(71) Applicant: The United States of America, as represented by the Secretary of the Navy, Arlington, VA (US)

(72) Inventors: Shawn Kerry McGann, Ridgecrest, CA (US); Nicholas McGaha, Ridgecrest, CA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 255 days.

This patent is subject to a terminal disclaimer.

(21) Appl. No.: 17/398,274

(22) Filed: Aug. 10, 2021

Related U.S. Application Data

(63) Continuation-in-part of application No. 16/180,425, filed on Nov. 5, 2018, now Pat. No. 11,117,667.

(51) Int. Cl.
*B64U 10/14* (2023.01)
*B64D 5/00* (2006.01)
*B64U 70/20* (2023.01)

(52) U.S. Cl.
CPC ............. *B64U 10/14* (2023.01); *B64D 5/00* (2013.01); *B64U 70/20* (2023.01)

(58) Field of Classification Search
CPC ... B64D 1/06; B64D 1/12; B64D 1/02; B64D 5/00; B64D 37/02; B64C 2201/082; B64C 2201/206; B64U 70/20; B64U 80/82
See application file for complete search history.

(56) References Cited

U.S. PATENT DOCUMENTS

| | | | |
|---|---|---|---|
| 3,273,459 A * | 9/1966 | Lardin | B64D 1/06 294/82.26 |
| 4,697,764 A * | 10/1987 | Hardy | B64D 1/06 89/1.51 |
| 2017/0297712 A1* | 10/2017 | Kim | B64C 39/024 |
| 2018/0170510 A1* | 6/2018 | Brock | B64C 27/12 |

* cited by examiner

*Primary Examiner* — Richard Green
*Assistant Examiner* — Arfan Y. Sinaki
(74) *Attorney, Agent, or Firm* — Naval Air Warfare Center Weapons Division; Jimmy M. Sauz; James M. Saunders

(57) ABSTRACT

An unmanned aerial vehicle (UAV) jettison apparatus. The UAV jettison apparatus may comprise a payload bay, fairing, ejector plate, and releasable latch. The payload bay may be mounted beneath an aircraft and may have an inner space and a top plate attached therewith. The fairing may substantially cover the inner space of the payload bay and may have an opening positioned directly below the top plate. The ejector plate, which may be spring-loaded, may substantially cover the opening and may be used to mount the UAV. The releasable latch, which may be disposed between the top plate and the ejector plate, may releasably lock and hold the UAV in a stowed position and, upon release, may allow the ejector plate to move into a launch position, such that the UAV is released and jettisoned from a larger aircraft.

16 Claims, 10 Drawing Sheets

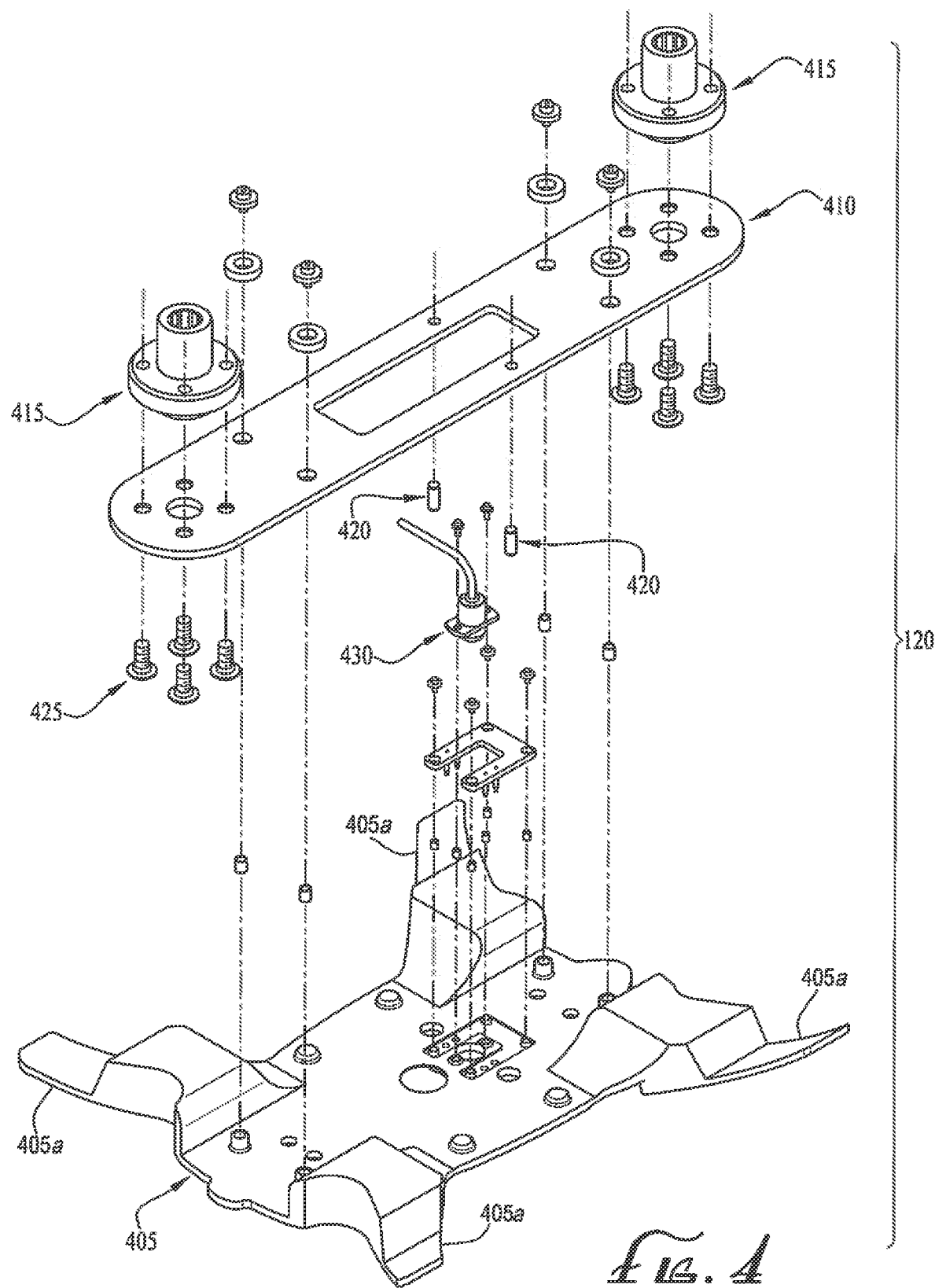

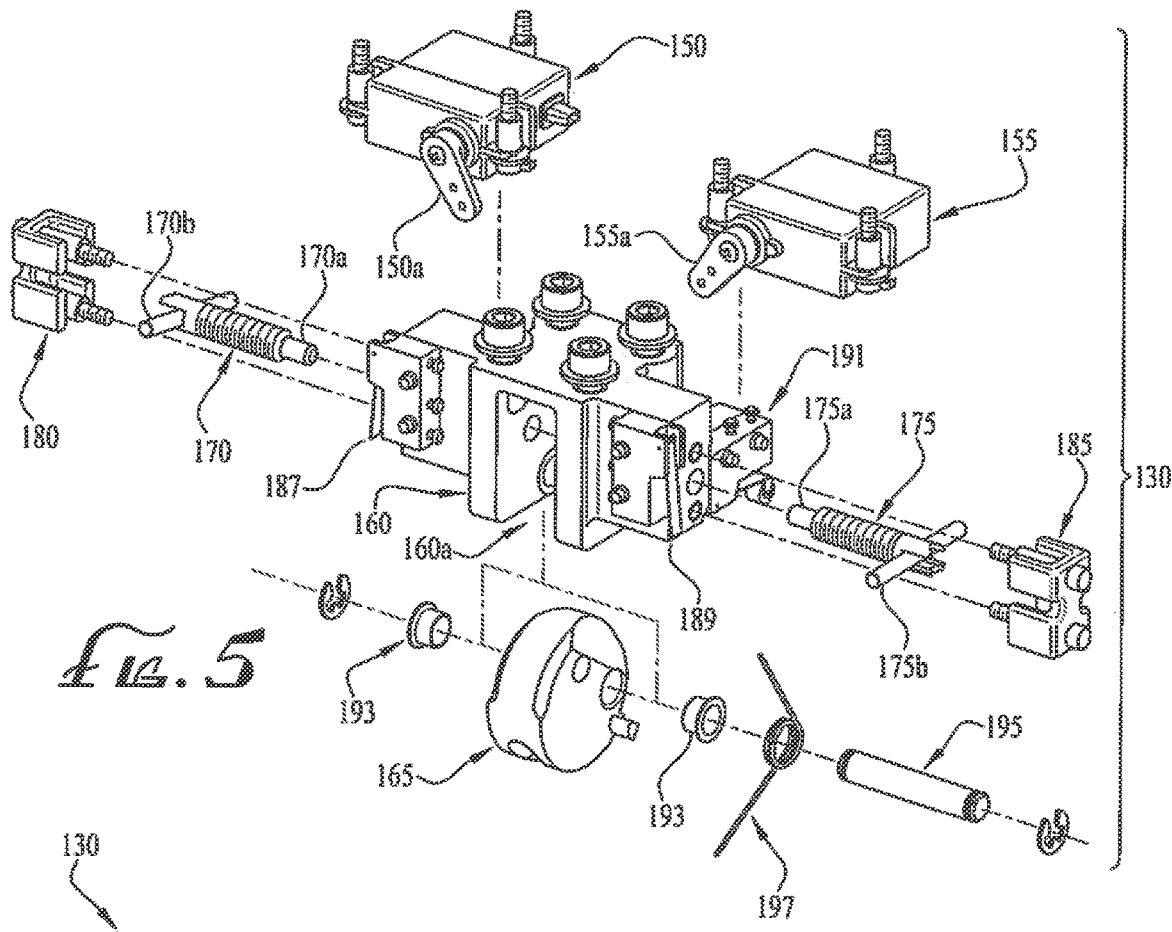
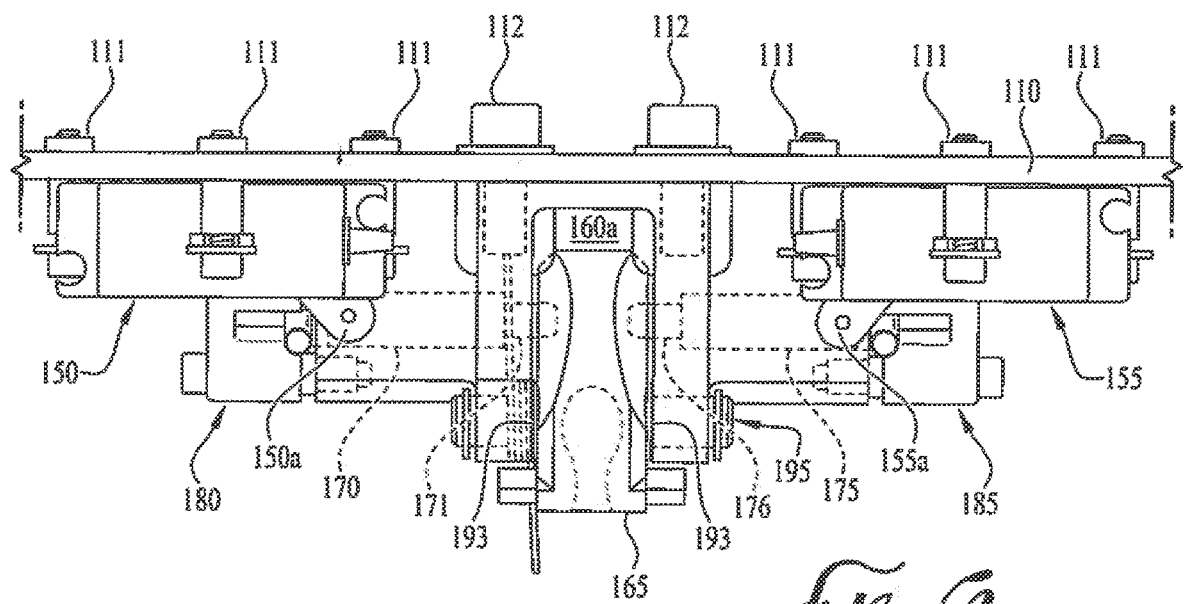

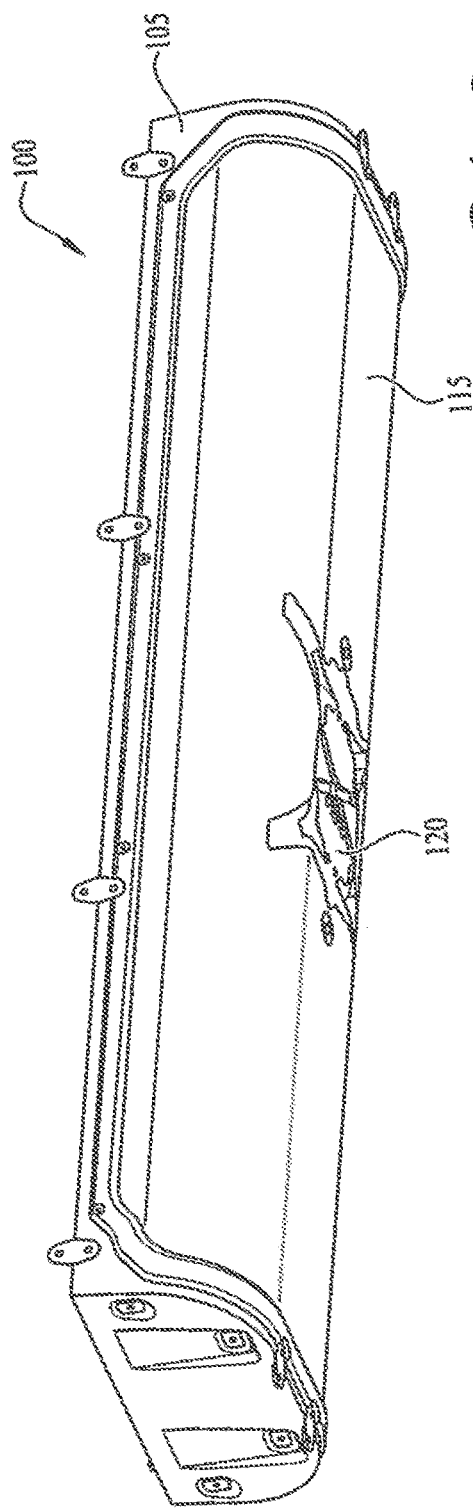
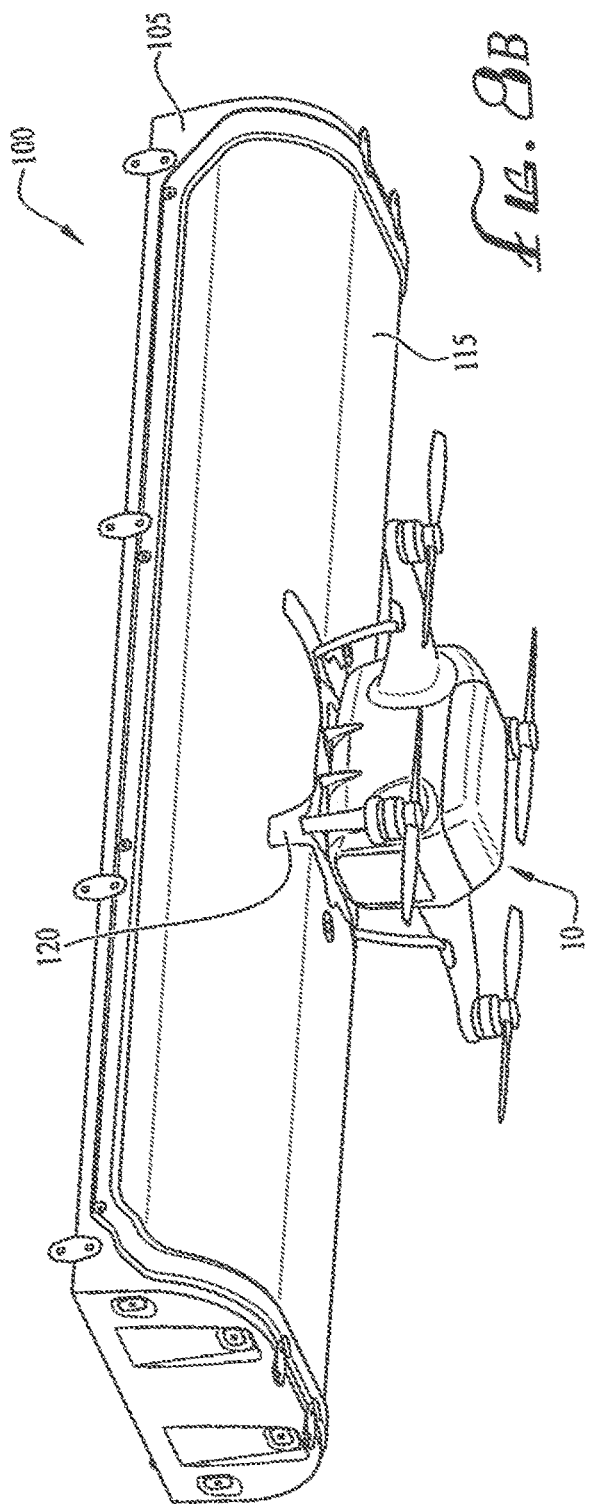
FIG. 8A
FIG. 8B

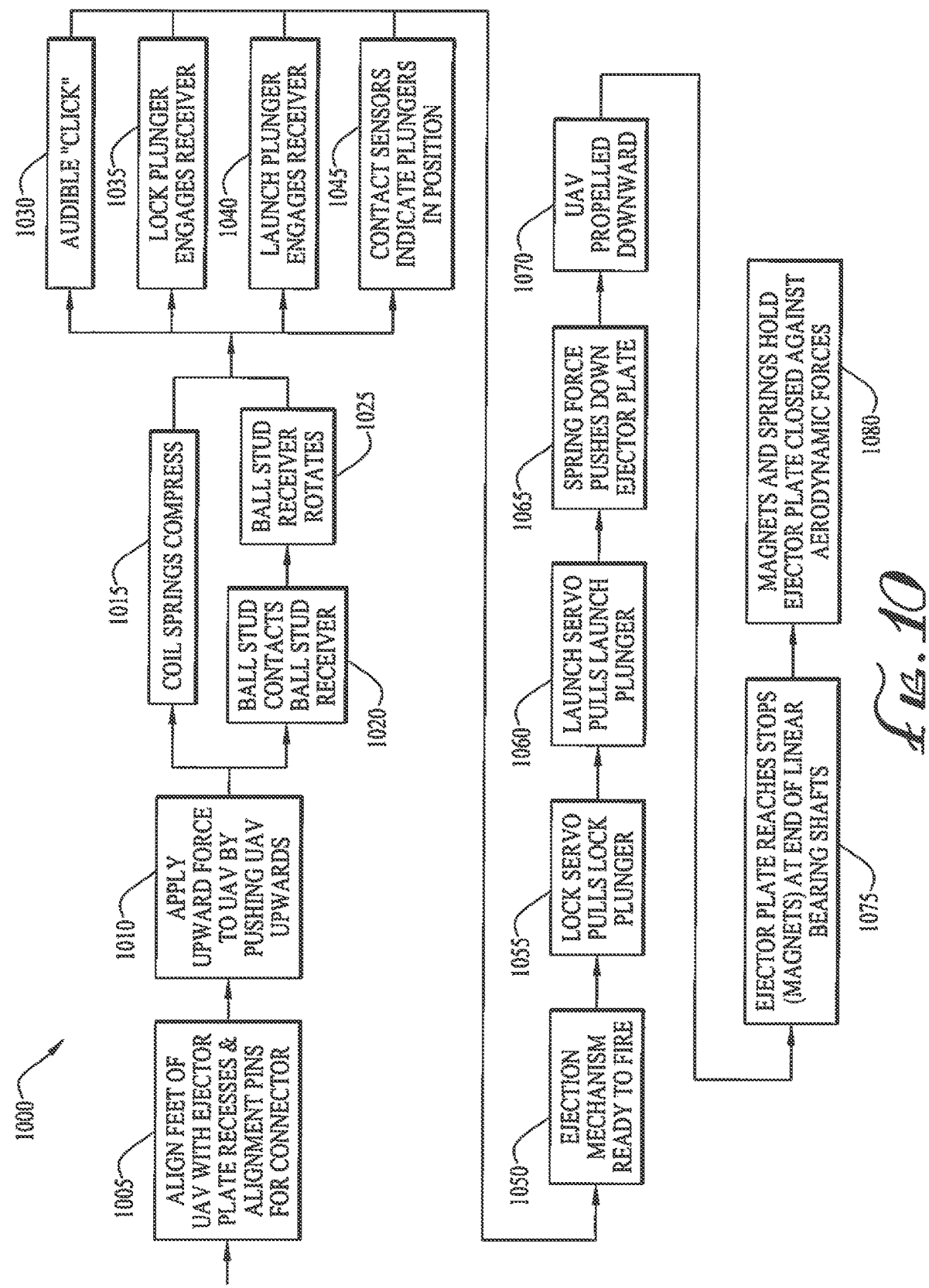

ical embodiments will be apparent from the description, the claims, and the accompanying drawings.

UNMANNED AERIAL VEHICLE JETTISON APPARATUS

CROSS-REFERENCE TO RELATED APPLICATIONS

This application is a continuation-in-part patent application of the commonly owned, U.S. non-provisional patent application Ser. No. 16/180,425, titled "Unmanned Aerial Vehicle Jettison Apparatus," filed on Nov. 5, 2018 by co-inventors Shawn Kerry McGann and Nicholas McGaha, the contents of which are hereby expressly incorporated herein by reference in its entirety and to which priority is claimed.

The invention described herein may be manufactured and used by or for the government of the United States of America for governmental purposes without the payment of any royalties thereon or therefor.

FIELD

The present disclosure relates generally to apparatuses for releasing, ejecting, and/or jettisoning an unmanned aerial vehicle (UAV) from an aircraft.

BACKGROUND

UAVs are often used in various applications in environments that are unacceptably too costly or dangerous to humans. Such applications may include policing, surveillance, and testing. UAVs, for instance, may be used to detect enemy threats autonomously from aerial vantage points.

Due to battery power constraints, the mission scope of a UAV is generally limited. These limitations affect flight duration and operating ranges. As a result, the operating regions of the UAVs are usually restricted to areas proximate to the operator. Because much of the UAV's power is spent achieving safe standoff from the operator, it is often desirable to have the UAV manually transported to its desired location before operation.

One solution is to have an aircraft transport and release the UAV at a desired location. In this case, the UAV may be stored within the fuselage of the aircraft and, upon release of the aircraft's bomb bay doors, the UAV may jettison to the desired region and vicinity. Unfortunately, the limited payload volume of the fuselage may restrict various types of UAVs for transport, including multirotor UAVs. Also, during jettison of the UAV, the bomb bay doors may also negatively affect flight performance due to drag occurring beneath the aircraft.

Therefore, based on the foregoing, a need exists that overcomes these deficiencies. The present disclosure solves these deficiencies and generally represents a new and useful innovation in release and ejection apparatuses for UAVs.

SUMMARY OF ILLUSTRATIVE EMBODIMENTS

To minimize the limitations in the related art and other limitations that will become apparent upon reading and understanding the present specification, the following discloses embodiments of a new and useful UAV jettison apparatus.

One embodiment may be a UAV jettison apparatus, comprising: a payload bay mounted beneath an aircraft and having an inner space and a top plate attached therewith; a fairing substantially covering the inner space of the payload bay and having an opening positioned directly below the top plate; an ejector plate substantially covering the opening and adapted for inverted mounting and launching of a UAV; a spring-loaded mechanism for launching the ejector plate downwards from a stowed position to a launch position and comprising: one or more coil springs and one or more linear bearing shafts; and a releasable latch configured to hold and lock the ejector plate at the stowed position, such that upon release of the releasable latch, the one or more coil springs may bias the ejector plate downwards and away from the top plate to the launch position. The ejector plate may comprise: an ejector fairing, a stiffener attached to a top surface of the ejector fairing, and one or more linear bearings attached to the stiffener. The opening of the fairing may be generally shaped as an outer contour of the ejector fairing and the UAV. The UAV may comprises a ball stud portion located beneath the UAV, the ball stud portion having a ball and a post; and wherein the releasable latch may comprise: a ball stud receiver having an opening sized to receive the ball stud portion and a channel adapted to retain the ball with the post extending through the opening, the channel being radially formed inwards from the opening, wherein the ball stud receiver may be substantially circular in shape; a housing having a wheel mount formed therein for rotatably coupling the ball stud receiver around an axis and a torsion spring for biasing a rotation of the ball stud receiver away from a holding position, the housing having a first bore extending through the wheel mount and the ball stud receiver when the ball stud receiver is rotated to the holding position; a lock plunger disposed in the housing and having a forward end adapted to moveably engage the ball stud receiver via the first bore when the ball stud receiver is in the holding position; and a lock servo for driving the forward end of the lock plunger away from the ball stud receiver, such that the forward end of the lock plunger may disengage the ball stud receiver. The housing may further comprise a second bore extending through the wheel mount and the ball stud receiver when the ball stud receiver is rotated into the holding position; and wherein the releasable latch may further comprise: a launch plunger disposed in the housing and having a forward end adapted to moveably engage the ball stud receiver via the second bore when the ball stud receiver is in the holding position; and a launch servo for driving the forward end of the launch plunger away from the ball stud receiver such that, the forward end of launch plunger may disengage the ball stud receiver; wherein, when the forward ends of the lock plunger and the launch plunger disengage the ball stud receiver, the ball stud receiver may rotate from the holding position to a release position, thereby releasing the ball stud portion and causing the one or more coil springs to bias the ejector plate away from the top plate to the launch position. The ejector plate may further comprise a connector adapted to electrically couple the UAV when the UAV is mounted on the ejector plate in an inverted manner. The UAV may be a multirotor UAV, Another embodiment may be a UAV jettison apparatus, comprising: a payload bay mounted beneath an aircraft when the aircraft is in a horizontal flight orientation and having an inner space and a top plate attached therewith; a fairing substantially covering the inner space of the payload bay and having an opening positioned directly below the top plate, the opening being sized to fit at least a bottom portion of a UAV; an ejector plate substantially covering the opening and adapted for inverted mounting and launching of the UAV; a spring-loaded mechanism for launching the ejector plate downwards from a stowed position to a launch position and comprising: one or more linear bearing shafts extending downwards from the top plate and adapted to guide the ejector plate vertically between the stowed position and the launch position; and one or more coil springs for exerting a spring-loaded force on the ejector plate, the one or more coil springs surrounding the one or more linear bearing shafts and disposed between the top plate and the ejector plate; a releasable latch disposed between the top plate and the ejector plate and configured to lock and hold the UAV at the stowed position, such that upon release of the releasable latch, the one or more coil springs may bias the ejector plate away from the top plate to the launch position. The ejector plate may comprise: an ejector fairing generally shaped as an outer contour of the UAV, a stiffener attached to a top surface of the ejector fairing, and one or more linear bearings attached to the stiffener and adapted to move along the one or more linear beating shafts. The UAV may comprise a ball stud portion located beneath the UAV, the ball stud portion having a ball and a post; and wherein the releasable latch may comprise: a ball stud receiver having an opening sized to receive the ball stud portion and a channel adapted to retain the ball with the post extending through the opening, the channel being radially formed inward from the opening, wherein the ball stud receiver may be substantially circular in shape; a housing having a wheel mount formed therein for rotatably coupling the ball stud receiver around an axis and a torsion spring for biasing a rotation of the ball stud receiver away from a holding position, the housing having a first bore extending through the wheel mount and the ball stud receiver when the ball stud receiver is rotated to the holding position; a lock plunger disposed in the housing and having a forward end adapted to moveably engage the ball stud receiver via the first bore when the ball stud receiver is in the holding position; and a lock servo for driving the forward end of the lock plunger away from the ball stud receiver, such that the forward end of the lock plunger may disengage the ball stud receiver. The housing may further comprise a second bore extending through the wheel mount and the ball stud receiver when the ball stud receiver is rotated into the holding position; and wherein the releasable latch may further comprise: a launch plunger disposed in the housing and having a forward end adapted to moveably, engage the ball stud receiver via the second bore when the ball stud receiver is in the holding position; and a launch servo for driving the forward end of the launch plunger away from the ball stud receiver such that, the forward end of launch plunger may disengage the ball stud receiver; wherein, when the forward ends of the lock plunger and the launch plunger disengage the ball stud receiver, the ball stud receiver may rotate from the holding position to a release position, thereby releasing the ball stud portion and causing the one or more coil springs to bias the ejector plate downwards and away from the top plate to the launch position. The ejector plate may further comprise a connector adapted to electrically couple the UAV when the UAV is mounted on the ejector plate in an inverted manner; and wherein the connector may provide electric communication between the UAV and the aircraft. The UAV may be a multirotor UAV having at least four arm portions extending outwardly and diametrically opposed; and wherein each of the at least four arm portions may comprise a motor and corresponding propeller. The aircraft may be a UAV generally larger than the multirotor UAV.

Another embodiment may be a UAV jettison apparatus, comprising: a payload bay mounted beneath a first UAV when the first UAV is in a horizontal flight orientation and having an inner space and a top plate attached therewith; a fairing substantially covering the inner space of the payload bay and having an opening positioned directly below the top plate, the opening being sized to fit at least a bottom portion of a second UAV; an ejector plate substantially covering the opening and adapted for inverted mounting of the second UAV having a ball stud portion, the ball stud portion having a ball and a post; a spring-loaded mechanism for launching the ejector plate downwards from a stowed position to a launch position and comprising: one or more linear bearing shafts extending downwards from the top plate and adapted to guide the ejector plate vertically between the stowed position and the launch position; and one or more coil springs surrounding the one or more linear bearing shafts, the one or more coil springs being disposed between the top plate and the ejector plate and adapted to exert a spring-loaded force on the ejector plate; and a releasable latch disposed between the top plate and the ejector plate and configured to releasably lock and hold the second UAV at the stowed position, such that upon release of the releasable latch, the one or more coil springs may bias the ejector plate downwards and away from the top plate and to the launch position, the releasable latch comprising: a ball stud receiver having an opening sized to receive the ball stud portion and a channel adapted to retain the ball with the post extending through the opening, the channel being radially formed inward from the opening, wherein the ball stud receiver may be substantially circular in shape; a housing having a wheel mount formed therein for rotatable coupling the ball stud receiver around an axis and a torsion spring for biasing a rotation of the ball stud receiver away from a holding position, the housing having a first bore extending through the wheel mount and the ball stud receiver when the ball stud receiver is rotated to the holding position; a lock plunger disposed in the housing and having a forward end adapted to moveably engage the ball stud receiver via the first bore when the ball stud receiver is in the holding position; and a lock servo for driving the forward end of the lock plunger away from the ball stud receiver, such that the forward end of the lock plunger may disengage the ball stud receiver. The ejector plate may comprise: an ejector fairing having an outer contour with at least four arm portions extending outwardly and diametrically opposed; a stiffener attached to a top surface of the ejector fairing; and one or more linear bearings attached to the stiffener and adapted to move along the one or more linear bearing shafts. The opening of the fairing may be generally shaped as the outer contour of the ejector fairing. The housing may further comprise a second bore extending through the wheel mount and the ball stud receiver when the ball stud receiver is rotated into the holding position; and wherein the releasable latch may further comprise: a launch plunger disposed in the housing and having a forward end adapted to moveably engage the ball stud receiver via the second bore when the ball stud receiver is in the holding position; and a launch servo for driving the forward end of the launch plunger away from the ball stud receiver such that, the forward end of launch plunger may disengage the ball stud receiver; wherein, when the forward ends of the lock plunger and the launch plunger disengage the ball stud receiver, the ball stud receiver may rotate from the holding position to a release position, thereby releasing the ball stud portion and causing the one or more coil springs to bias the ejector plate downwards and away from the top plate to the launch position. The ejector plate may further comprise a connector adapted to electrically couple the second UAV when the second UAV is mounted on the ejector plate in an inverted manner; and wherein the connector may provide electric communication between the first UAV and the second UAV. The first UAV may be a fixed winged aircraft; and wherein the second UAV may be a multirotor UAV.

Another embodiment may be an unmanned aerial vehicle (UAV) jettison apparatus; comprising: a payload bay mounted beneath an aircraft and having an inner space and a top plate attached therewith; a fairing substantially covering the inner space of the payload bay and having an opening positioned directly below the top plate; an ejector plate substantially covering the opening and adapted for inverted mounting and launching of a UAV, the ejector plate comprising: an ejector fairing; a stiffener attached to a top surface of the ejector fairing; and one or more linear bearings attached to the stiffener; a spring-loaded mechanism for launching the ejector plate downwards from a stowed position to a launch position and comprising: one or more coil springs and one or more linear bearing shafts; and a releasable latch configured to hold and lock the ejector plate at the stowed position, such that upon release of the releasable latch, the one or more coil springs bias the ejector plate downwards and away from the top plate to the launch position; wherein the UAV may be a multirotor UAV having at least four arm portions extending outwardly and diametrically opposed, each of the at least four arm portions comprising a motor and corresponding propeller; and wherein an outer contour of the ejector fairing may be generally shaped as the multirotor UAV, such that the ejector fairing has at least four arm portions extending outwardly and diametrically opposed. The opening of the fairing may be generally shaped as the outer contour of the ejector fairing and the UAV. The UAV may comprise a ball stud portion located beneath the UAV, the ball stud portion having a ball and a post; wherein the releasable latch may comprise: a ball stud receiver having an opening sized to receive the ball stud portion and a channel adapted to retain the ball with the post extending through the opening, the channel being radially formed inwards from the opening, wherein the ball stud receiver may be substantially circular in shape; a housing having a wheel mount formed therein for rotatably coupling the ball stud receiver around an axis and a torsion spring for biasing a rotation of the ball stud receiver away from a holding position, the housing having a first bore extending through the wheel mount and the ball stud receiver when the ball stud receiver is rotated to the holding position; a lock plunger disposed in the housing and having a forward end adapted to moveably engage the ball stud receiver via the first bore when the ball stud receiver is in the holding position; and a lock servo for driving the forward end of the lock plunger away from the ball stud receiver, such that the forward end of the lock plunger disengages the ball stud receiver. The housing may further comprise a second bore extending through the wheel mount and the ball stud receiver when the ball stud receiver is rotated into the holding position; and wherein the releasable latch may further comprise: a launch plunger disposed in the housing and having a forward end adapted to moveably engage the ball stud receiver via the second bore when the ball stud receiver is in the holding position; and a launch servo for driving the forward end of the launch plunger away from the ball stud receiver such that, the forward end of launch plunger may disengage the ball stud receiver; wherein, when the forward ends of the lock plunger and the launch plunger disengage the ball stud receiver, the ball stud receiver may rotate from the holding position to a release position, thereby releasing the ball stud portion and causing the one or more coil springs to bias the ejector plate away from the top plate to the launch position. The ejector plate may further comprise a connector adapted to electrically couple the UAV when the UAV is mounted on the ejector plate in an inverted manner.

Another embodiment may be a UAV jettison apparatus, comprising: a payload bay mounted beneath an aircraft when the aircraft is in a horizontal flight orientation and having an inner space and a top plate attached therewith; a fairing substantially covering the inner space of the payload bay and having an opening positioned directly below the top plate, the opening being sized to fit at least a bottom portion of a UAV; an ejector plate substantially covering the opening and adapted for inverted mounting and launching of the UAV; a spring-loaded mechanism for launching the ejector plate downwards from a stowed position to a launch position and comprising: one or more linear bearing shafts extending downwards from the top plate and adapted to guide the ejector plate vertically between the stowed position and the launch position; one or more coil springs for exerting a spring-loaded force on the ejector plate, the one or more coil springs surrounding the one or more linear bearing shafts and disposed between the top plate and the ejector plate; and a releasable latch disposed between the top plate and the ejector plate and configured to lock and hold the UAV at the stowed position, such that upon release of the releasable latch, the one or more coil springs bias the ejector plate away from the top plate to the launch position; wherein the UAV may be a multirotor UAV having at least four arm portions extending outwardly and diametrically opposed; and wherein each of the at least four arm portions may comprise a motor and corresponding propeller. The ejector plate may comprise: an ejector fairing generally shaped as an outer contour of the UAV; a stiffener attached to a top surface of the ejector fairing; and one or more linear bearings attached to the stiffener and adapted to move along the one or more linear bearing shafts. The UAV may, comprise a ball stud portion located beneath the UAV, the ball stud portion having a ball and a post; and wherein the releasable latch may comprise: a ball stud receiver having an opening sized to receive the ball stud portion and a channel adapted to retain the ball with the post extending through the opening, the channel being radially formed inward from the opening, wherein the ball stud receiver may be substantially circular in shape; a housing having a wheel mount formed therein for rotatably coupling the ball stud receiver around an axis and a torsion spring for biasing a rotation of the ball stud receiver away from a holding position, the housing having a first bore extending through the wheel mount and the ball stud receiver when the ball stud receiver is rotated to the holding position; a lock plunger disposed in the housing and having a forward end adapted to moveably engage the ball stud receiver via the first bore when the ball stud receiver is in the holding position; and a lock servo for driving the forward end of the lock plunger away from the ball stud receiver, such that the forward end of the lock plunger may disengage the ball stud receiver. The housing may further comprise a second bore extending through the wheel mount and the ball stud receiver when the ball stud receiver is rotated into the holding position; and wherein the releasable latch may further comprise: a launch plunger disposed in the housing and having a forward end adapted to moveably engage the ball stud receiver via the second bore when the ball stud receiver is in the holding position; and a launch servo for driving the forward end of the launch plunger away from the ball stud receiver such that, the forward end of the launch plunger may disengage the ball stud receiver; wherein, when the forward ends of the lock plunger and the launch plunger disengage the ball stud receiver, the ball stud receiver may rotate from the holding position to a release position, thereby releasing the ball stud portion and causing the one or more coil springs to bias the ejector plate downwards and away from the top plate to the launch position. The ejector plate may further comprise a connector adapted to electrically couple the UAV when the UAV is mounted on the ejector plate in an inverted manner; and wherein the connector may provide electric communication between the UAV and the aircraft The aircraft may be a UAV generally larger than the multirotor UAV.

A UAV jettison apparatus, comprising: a payload bay mounted beneath a first UAV when the first UAV is in a horizontal fight orientation and having an inner space and a top plate attached therewith; a fairing substantially covering the inner space of the payload bay and having an opening positioned directly below the top plate, the opening being sized to fit at least a bottom portion of a second UAV; an ejector plate substantially covering the opening and adapted for inverted mounting of the second UAV having a ball stud portion, the ball stud portion having a ball and a post, and wherein the ejector plate may comprise: an ejector fairing having an outer contour with at least four arm portions extending outwardly and diametrically opposed; a stiffener attached to a top surface of the ejector fairing; and one or more linear bearings attached to the stiffener and adapted to move along the one or more linear bearing shafts; a spring-loaded mechanism for launching the ejector plate downwards from a stowed position to a launch position and comprising: one or more linear bearing shafts extending downwards from the top plate and adapted to guide the ejector plate vertically between the stowed position and the launch position; and one or more coil springs surrounding the one or more linear bearing shafts, the one or more coil springs being disposed between the top plate and the ejector plate and adapted to exert a spring-loaded force on the ejector plate; and a releasable latch disposed between the top plate and the ejector plate and configured to releasably lock and hold the second UAV at the stowed position, such that upon release of the releasable latch, the one or more coil springs bias the ejector plate downwards and away from the top plate and to the launch position, the releasable latch comprising: a ball stud receiver having an opening sized to receive the ball stud portion and a channel adapted to retain the ball with the post extending through the opening, the channel being radially formed inward from the opening, wherein the ball stud receiver may be substantially circular in shape; a housing having a wheel mount formed therein for rotatably coupling the ball stud receiver around an axis and a torsion spring for biasing a rotation of the ball stud receiver away from a holding position, the housing having a first bore extending through the wheel mount and the ball stud receiver when the ball stud receiver is rotated to the holding position; a lock plunger disposed in the housing and having a forward end adapted to moveably engage the ball stud receiver via the first bore when the ball stud receiver is in the holding position; and a lock servo for driving the forward end of the lock plunger away from the ball stud receiver, such that the forward end of the lock plunger may disengage the ball stud receiver. The opening of the fairing may be generally shaped as the outer contour of the ejector fairing. The housing may further comprise a second bore extending through the wheel mount and the ball stud receiver when the ball stud receiver is rotated into the holding position; and wherein the releasable latch may further comprise: a launch plunger disposed in the housing and having a forward end adapted to moveably engage the ball stud receiver via the second bore when the ball stud receiver is in the holding position; and a launch servo for driving the forward end of the launch plunger away from the ball stud receiver such that, the forward end of launch plunger may disengage the ball stud receiver; wherein, when the forward ends of the lock plunger and the launch plunger disengage the ball stud receiver, the ball stud receiver may rotate from the holding position to a release position, thereby releasing the ball stud portion and causing the one or more coil springs to bias the ejector plate downwards and away from the top plate to the launch position. The ejector plate may further comprise a connector adapted to electrically couple the second UAV when the second UAV is mounted on the ejector plate in an inverted manner; and wherein the connector may provide electric communication between the first UAV and the second UAV. The first UAV may be a fixed winged aircraft; and wherein the second UAV may be a multirotor UAV.

The advantage of the UAV jettison apparatus disclosed herein generally lies in its ability to transport various UAV types and payload sizes while minimizing drag. Specifically, embodiments of the UAV jettison apparatus may be configured to couple and stow a UAV beneath a larger aircraft such as a larger UAV. While stowed, an upper portion of the UAV may protrude, allowing various types of UAVs for transport, including multirotor UAVs. Upon jettison of the UAV, the ejector plate used to mount the UAV may drop and align with the fairing to reduce drag beneath the aerodynamic surface of the aircraft.

It is an object to provide a UAV jettison apparatus that accommodates various UAV payloads, including multirotor UAVs. Thus, embodiments of the UAV jettison apparatus may allow a larger UAV to transport and jettison a multirotor UAV.

It is an object to provide a UAV jettison apparatus that preferably provides an aerodynamic surface that reduces drag even after jettisoning a UAV from the aircraft.

It is an object to overcome the limitations of the prior art.

These, as well as other components, steps, features, objects, benefits, and advantages, will now become clear from a review of the following detailed description of illustrative embodiments, the accompanying drawings, and the claims.

BRIEF DESCRIPTION OF THE DRAWINGS

The drawings are illustrative embodiments. They do not illustrate all embodiments. They do not set forth all embodiments. Other embodiments may be used in addition or instead. Details, which may be apparent or unnecessary, may be omitted to save space or for more effective illustration. Some embodiments may be practiced with additional components or steps and/or without all of the components or steps, which are illustrated. When the same numeral appears in different drawings, it is intended to refer to the same or like components or steps.

FIG. 4 is an exploded view of one embodiment of an ejector plate.

FIG. 5 is an exploded view of one embodiment of a releasable latch.

FIG. 6 is an assembled view of one embodiment of the releasable latch.

FIGS. 8A to 8C are illustrations of perspective views of one embodiment of the UAV jettison apparatus and shows the loading sequence of the UAV jettison apparatus.

FIG. 10 is a flow diagram of the loading and launch sequence for one embodiment of the UAV jettison apparatus.

DETAILED DESCRIPTION OF ILLUSTRATIVE EMBODIMENTS

Figure 1:
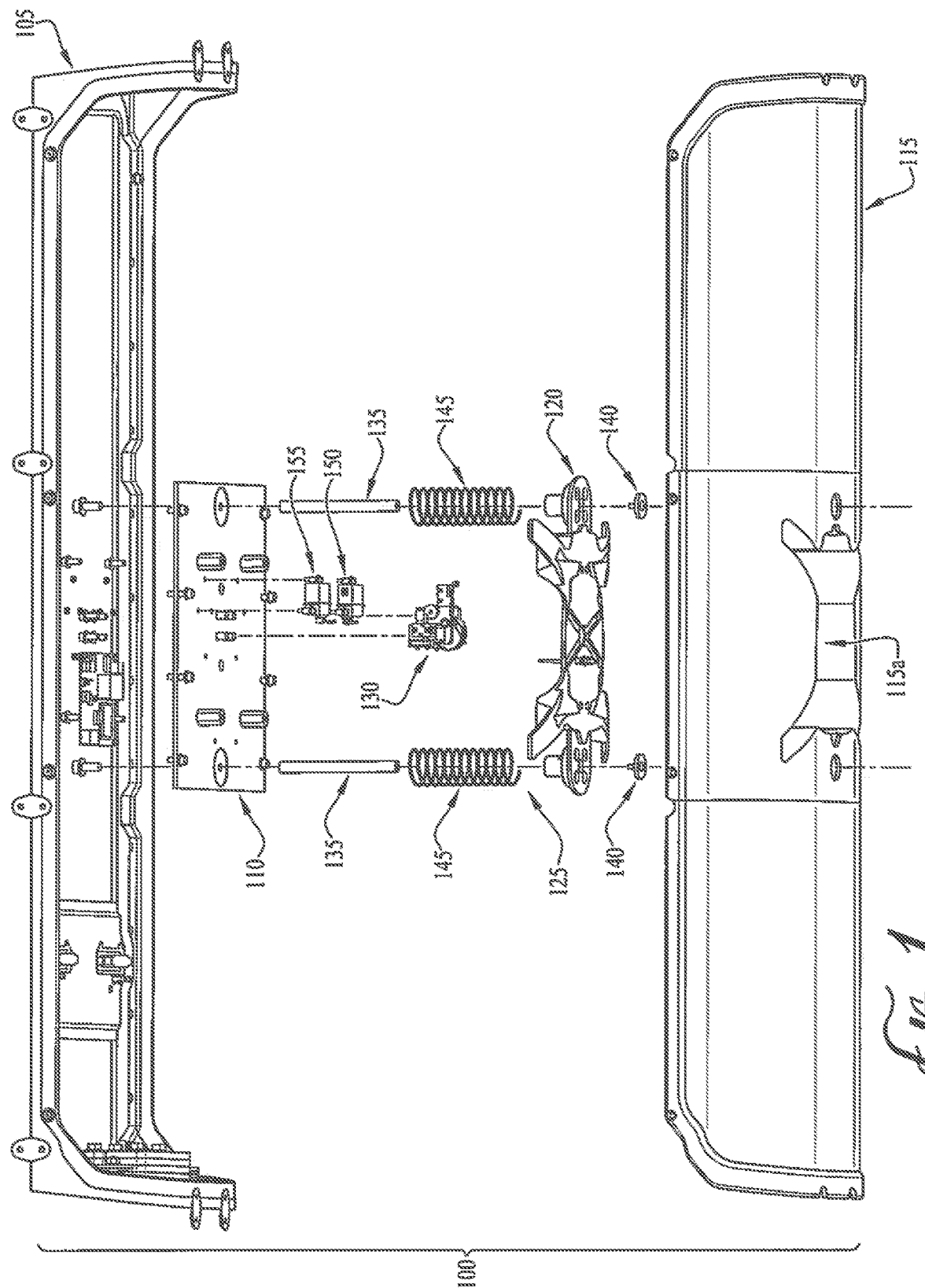
FIG. 1 is an exploded view of one embodiment of a UAV jettison apparatus.

In the following detailed description, numerous specific details are set forth in order to provide a thorough understanding of various aspects of one or more embodiments of the unmanned aerial vehicle (UAV) jettison apparatus. However, these embodiments may be practiced without some or all of these specific details. In other instances, well-known methods, procedures, and/or components have not been described in detail so as not to unnecessarily obscure the aspects of these embodiments.

Before the embodiments are disclosed and described, it is to be understood that these embodiments are not limited to the particular structures, process steps, or materials disclosed herein, but is extended to equivalents thereof as would be recognized by those ordinarily skilled in the relevant arts. IT should also be understood that terminology used herein is used for the purpose of describing particular embodiments only and is not intended to be limiting.

Reference throughout this specification to "one embodiment," "an embodiment," or "another embodiment" may mean that a particular feature, structure, or characteristic described in connection with the embodiment may be included in at least one embodiment of the present disclosure. Thus, appearances of the phrases "in one embodiment" or "in an embodiment" in various places throughout this specification may not necessarily refer to the same embodiment.

Furthermore, the described features, structures, or characteristics may be combined in any suitable manner in various embodiments. In the following description, numerous specific details are provided, such as examples of materials, fasteners, sizes, lengths, widths, shapes. etc . . . , to provide a thorough understanding of the embodiments. One skilled in the relevant art will recognize, however, that the scope of protection can be practiced without one or more of the specific details, or with other methods, components, materials, etc . . . . In other instances, well-known structures, materials, or operations are generally not shown or described in detail to avoid obscuring aspects of the disclosure.

Definitions

In the following description, certain terminology is used to describe certain features of the embodiments of a UAV jettison apparatus. For example, as used herein, unless otherwise specified, the terms "unmanned aircraft," "unmanned aerial vehicle," "unmanned aerial system," "UAS," "UAV," and "drone" generally refer to any unmanned aircraft capable of being piloted without having a human pilot onboard and may include multirotor UAVs. These UAVs may be controlled. remotely or autonomously via an onboard computer or the like.

As used herein, the term "aircraft" refers to any machine capable of flight and utilizing the UAV jettison apparatus for transport and jettison of a UAV. Importantly, an aircraft may also be a UAV, such that the aircraft and UAV for transport/jettison are both UAVs. For example, in an embodiment, the aircraft may be a large UAV capable of transporting and ejecting a smaller UAV, including a multirotor UAV.

As used herein, the term "substantially" refers to the complete, or nearly complete, extent or degree of an action, characteristic, property, state, structure, item, or result. As an arbitrary example, an object that is "substantially" enclosed would mean that the object is either completely enclosed or nearly completely enclosed. The exact allowable degree of deviation from absolute completeness may in some cases depend on the specific context. However, generally speaking, the nearness of completion will be so as to have the same overall result as if absolute and total completion were obtained.

The use of "substantially" is equally applicable when used in a negative connotation to refer to the complete or near complete lack of an action, characteristic, property, state, structure, item, or result. As another arbitrary example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein; the term "approximately" may refer to a range of values of ±10% of a specific value.

As used herein the term "somewhat" refers to a range of values of ±50% of a specific value.

As used herein, the term "about" is used to provide flexibility to a numerical range endpoint by providing that a given value may be "a little above" or "a little below" the endpoint. In some cases, the term "about" is to include a range of not more than about two inches of deviation.

As an illustration, a numerical range of "about 1 inch to about 5 inches" should be interpreted to include not only the explicitly recited values of about 1 inch to about 5 inches, but also include individual values and sub-ranges within the indicated range. Thus, included in this numerical range are individual values such as 2, 3, and 4 and sub-ranges such as from 1-3, from 2-4, and from 3-5.

Distances, forces, weights, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited.

This same principle applies to ranges reciting only one numerical value and should apply regardless of the breadth of the range or the characteristics being described.

As used herein in this disclosure, the singular forms "a" and "the" may include plural referents, unless the context clearly dictates otherwise. Thus, for example, reference to a "coil spring" can include reference to one or more of such coil springs.

This disclosure relates generally to loading, transport, and deployment apparatuses for UAVs, and more particularly, to apparatuses that jettison a UAV from a larger aircraft. For example, one embodiment of the UAV jettison apparatus disclosed herein may allow a multirotor UAV to be loaded on, transported by, and jettisoned from a larger UAV.

In general, the mission scope of a UAV is limited due to battery power constraints. These limitations affect flight duration and operating ranges. Thus, it is often desirable to transport a UAV to a desired location before operation. One solution is to have a larger aircraft transport and release the UAV at a desired location. The UAV may be carried by the aircraft and, upon its release, may jettison to the desired region and vicinity to perform its purported mission.

Unfortunately, the limited payload space of the larger aircraft may restrict various types of UAVs for transport such as multirotor UAVs. Additionally, upon jettison of the UAV, conventional deployment mechanisms such as bomb bay doors may also negatively affect flight performance of the larger aircraft due to drag by the bomb bay doors. Accordingly, the embodiments disclosed herein solve this problem by stowing the UAV beneath the aircraft through the combinational use of an ejector plate, spring loaded mechanism, and releasable latch. The UAV may be stowed within the fuselage of the larger aircraft, and while stowed, the upper portion of the UAV may protrude, allowing various sizes of UAVs for transport. Thus, upon jettison of the UAV, the ejector plate may also drop and align with the fairing to reduce the drag.

In the accompanying drawings, like reference numbers generally indicate like elements. Reference character 100 and variations thereof are used to depict embodiments of the UAV jettison apparatus. Several views are presented to depict some, though not all, of the possible orientations of the embodiments of the UAV jettison apparatus.

FIG. 1 is an exploded view of one embodiment of a UAV jettison apparatus. As shown in FIG. 1, one embodiment of the UAV jettison apparatus 100 may comprise: a payload bay 105, top plate 110, fairing 115, ejector plate 120, spring-loaded mechanism 125, and releasable latch 130. The spring-loaded mechanism 125 may comprise: linear bearing shafts 135, magnets 140, and coil springs 145. The releasable latch 130 may comprise a lock servo 150 and a launch servo 155.

The payload bay 105 may be a large compartment area for an aircraft, in which payloads and their support equipment may be carried and transported. In an exemplary embodiment, the payload bay 105 may be coupled to or integrated with the fuselage of the aircraft and may be uninterrupted by engines or any other aircraft related items. For example, in one embodiment, the payload bay 105 may be sufficiently large to accommodate a UAV or a portion thereof. In an another embodiment, the payload bay 105 may be sufficiently large to accommodate multiple UAVs, including multirotor UAVs. As such, it will be appreciated that the term "payload bay" may be considered generic to any number of applications where the bay is used to carry various types of UAVs and their support equipment.

The top plate 110 may be a plate mounted within the inner space of the payload bay 105 (preferably within the fuselage of the aircraft) and may be located at a particular post where the UAV may be transported beneath the aircraft. Importantly, the top plate 110 may be used for support and mounting of various components of the UAV jettison apparatus 100 such as the spring-loaded mechanism 125 and the releasable latch 130, both of which may be used for locking, holding, and/or ejecting the UAV from the aircraft.

The fairing 115 may be an outer structure of the aircraft used to cover the inner space of the payload bay 105 and is preferably configured to reduce drag. Thus, the fairing 115 is preferably aerodynamic and minimizes disruption to the flow of air over a surface. Importantly, the fairing 115 may comprise an opening 115a for mounting and transporting the UAV. In particular, the opening 115a may be sized and dimensioned to fit the ejector plate 120, and the ejector plate 120 may be used to mount the UAV. In multiple embodiments, the fairing 115 may be constructed of various materials such as metal or a polymer.

The ejector plate 120 may be a plate designed to substantially cover and fit the opening 115a of the fairing 115 and may be used for mounting a UAV in an inverted manner for transport. Importantly, the ejector plate 120 may be configured to move -vertically between a stowed position (i.e., up within the inner space of the payload bay 105) and a launch position (i.e., down covering the opening 115a of the fairing 115). As used herein, the term "stowed position" generally refers to a configuration where the ejector plate 120 is positioned within the payload bay 105 and inwards from the opening 115a of the fairing 115, such that the ejector plate 120 is tightly held against one or more coil springs 145 and locked into position. The ejector plate 120 in the stowed position may also create a recess or space for receiving and fitting a bottom portion of the UAV within the payload bay 105 for transportation.

As used herein, the term "launch position" generally refers to a configuration where the ejector plate 120 transitions downwards to the opening 115a of the fairing 115. In this manner, the ejector plate 120 is preferably not located within the payload bay 105 and preferably covers the opening 115a of the fairing 115, such that the UAV jettison apparatus 100 lacks a recess for stowing the UAV. Upon transitioning to the launch position, the ejector plate 120 may also create a downward force for ejecting or jettisoning the UAV from the aircraft. Preferably, the ejector plate 120 in the launch position may align along the fairing 115 to reduce drag.

In a preferred embodiment, the ejector plate 105 is preferably spring-loaded and may have an outer shape sized and dimensioned similar to the outer contour of the UAV for transport. Importantly, the ejector plate 120 is also preferably sized and dimension to fit the opening 115a of the fairing 115. The ejector plate 120 may comprise an ejector fairing 405 (shown in FIG. 4) having an outer surface that conforms with the outer contour of the fairing 115. For multirotor UAVs having several arm portions, for example, the ejector fairing 405 may also have several arm portions. In this manner, when the UAV is launched from the aircraft via spring-loaded force, the ejector plate 120 preferably covers the opening 115a of the fairing 115 to reduce drag during flight of the aircraft. An embodiment of an ejector fairing 405 having four arm portions 405a, shown in FIG. 4, for example, may be used to accommodate a multirotor UAV having four arm portions 15 (shown in FIG. 2).

The spring-loaded mechanism 125 may be one or more components used to bias the ejector plate 120 from the stowed position to the launch position via spring action. In particular, upon unlocking and release of the spring-loaded mechanism 125, the ejector plate 120 may be propelled into the launch position due to natural action of the coil springs 145. As recited above, the spring-loaded mechanism 125 may comprise: linear bearing shafts 135, magnets 140, and coil springs 145. Here, the coil springs 145 may surround the linear bearing shafts 135 and may bias the ejector plate 120 along the length of the linear beating shafts 135. In another embodiment, the coil spring 145 may be disposed outside the linear bearing shafts 135. Thus, the coil springs 145 may provide a spring-loaded force to propel the ejector plate 120 downwards towards the opening 115a of the fairing 115.

Because the ejector plate 120 is designed to move downwards along linear bearing shafts 135, the length of the linear beating shafts 135 may be affected by the depth of the payload bay 105.

FIG. 1 also shows that the UAV jettison apparatus 100 may comprise magnets 140. The magnets 140 may be located near or at the bottom of the linear bearing shafts 135 and may be configured to hold the ejector plate 120 in the launch position. Although FIG. 1 shows the UAV jettison apparatus 100 with magnets 140, other embodiments of the UAV jettison apparatus may lack magnets.

The releasable latch 130 may be a device configured to lock and release the ejector plate 120 from the stowed position to the launch position via the spring-loaded mechanism 125. One embodiment of the releasable latch 130 may comprise a lock servo 150, launch servo 155, housing 160, ball stud receiver 165, lock plunger 170, and launch plunger 175. The housing 160, ball stud receiver 165, lock plunger 170, and launch plunger 175 are shown in FIG. 5.

The housing 160 may hold various components of the releasable latch 130 and may be attached to the top plate 110, directly above the ejector plate 120. The housing 160 may also have a wheel mount 160a for rotatably coupling the ball stud receiver 165 around a fixed axis. In an exemplary embodiment, the housing 160 may comprise a first bore 171 (shown in FIG. 6) and second bore 176 (shown in FIG. 6), both of which preferably extend through both the wheel mount 160a and ball stud receiver 165 when the ball stud receiver 165 is rotated into a holding position (shown in FIGS. 7A and 7B).

The ball stud receiver 165 may be a cylindrical or circular wheel-like structure used to receive, hold, and secure a ball stud portion 12 (shown in FIGS. 9A to 9D) attached to the UAV. Thus, by holding and retaining the ball stud portion 12 by the ball stud receiver 165, the UAV is preferably held and secured to the UAV jettison apparatus 100. Specifically, the ball stud receiver 165 is preferably rotatable within the wheel mount 160a of the housing 160 and may have an opening 16511 (shown in FIGS. 9A to 9D) sized to fit and receive the ball 12a (shown in FIGS. 9A to 9D) of the ball stud portion 12. The ball stud receiver 165 may also comprise a channel 165b (shown in FIGS. 9A to 9D), which traverses from the opening 165a in an inward and radial fashion. In particular, the channel 165b is preferably radially and inwardly formed such that, upon insertion of the ball stud portion 12 into the ball stud receiver 165 and rotational movement of the ball stud receiver 165, the ball stud portion 12 may be pulled and held in place by the channel 165b of the hall stud receiver 165. In this manner, the opening 165a and channel 165b are preferably adapted to removably retain the ball 12a of the ball stud portion 12 while allowing the post 12b to extend through the opening 165a of the hall stud receiver 165.

The lock plunger 170 may be configured to engage and hold the hall stud receiver 165 when the ball stud receiver 165 is rotated into the holding position (i.e., when the ejector plate 120 is in the stowed position). Thus, the lock plunger 170 may be used as a locking device for holding the ejector plate 120 in the stowed position. In particular, the lock plunger 170 may comprise a T-handle 170b, which extends to or is physically coupled with a forward end 170a of the lock plunger, 170 and a spring that allows the forward end 170a of the lock plunger 170 to compress or expand. Thus, when the T-handle 170b is pulled, the forward end 170a of the lock plunger preferably retracts. Importantly, when the ball stud receiver 165 is not rotated to its holding position, the forward end 170a of the lock plunger may compress or retract due to non-alignment of the first bore 171. Once the ball stud receiver 165 rotates to its holding position, the first bore 171 is preferably aligned in both the wheel mount 160a and ball stud receiver 165, thereby allowing the forward end 170a of the lock plunger 170 to expand and engage into the ball stud receiver 165. In this manner, When the forward end 170a of the lock plunger 170 is engaged with the ball stud receiver 165, the ball stud receiver 165 is locked in the holding position. Conversely, when the forward end 170a of the lock plunger 170 compresses, retracts, or moves away from the hall stud receiver 165, the lock plunger 170 is preferably disengaged from the ball stud receiver 165 and thus in an unlocking position (shown in FIG. 7B).

Similarly, the launch plunger 175 may be configured to engage and hold the ball stud receiver 165 in the second bore 176 while the ball stud receiver 165 is in the holding position. Thus, the launch plunger 175 may be used as a hold and release mechanism to allow the ejector plate 120 to transition from the stowed position and into the launch position (while the lock plunger 170 is in the unlocking position). In particular, like the lock plunger 170, the launch plunger 175 may comprise a T-handle 175h, which extends to or is physically coupled with a forward end 175a of the launch plunger 175, and a spring that allows the forward end 175a of the launch plunger 175 to compress or expand. Thus, when the T-handle 175h is pulled, the forward end 175a of the launch plunger 175 preferably retracts. Importantly, when the ball stud receiver 165 is not rotated to its holding position, the forward end 175a of the launch plunger 175 may also compress or retract due to non-alignment of the second bore 176. Once the ball stud receiver 165 rotates to its holding position, the second bore 176 is preferably aligned in both the wheel mount 160a and ball stud receiver 165, thereby allowing the forward end 175a of the launch plunger 175 to expand and engage into the ball stud receiver 165. In this manner, when the forward end 175a of the launch plunger 175 is engaged with the ball stud receiver 165, the ball stud receiver 165 is held in the holding position. Conversely, when the forward end 175a of the launch plunger 175 compresses, retracts, or moves away from the ball stud receiver 165 (while the lock plunger 170 is in the unlocking position), the ball stud receiver 165 may rotate from the holding position to a release position (shown in FIG. 7C) in order to release the ball stud portion 12. As a result, the coil springs 145 may bias and propel the ejector plate 120 from the stowed position and into the launch position, jettisoning the UAV from the aircraft.

The lock servo 150 may be a rotary actuator used for angular control of a lock servo arm 150a. Thus, when the lock plunger 170 is in the locking position (i.e., engaged with the ball stud receiver 165), the lock servo arm 150a may drive the T-handle 170b of the lock plunger 170 away, causing the forward end 170a of the lock plunger 170 to retract. In this manner, the lock servo 150 may allow the lock plunger 170 to be in the unlocking position (i.e., disengaged from the ball stud. receiver 165). Similarly, the launch servo 155 may be a rotary actuator used for angular control of a launch servo arm 155a. Thus, when the launch plunger 175 is in the holding position (i.e., engaged with the ball stud receiver 165), the launch servo arm 155a may drive the T-handle 175b of the launch plunger 175 away, causing the forward end 175a of the launch plunger 175 to retract. In this manner, the launch servo 155 may allow the launch plunger 175 to be in a release position (i.e., disengaged from the ball stud receiver 165). Thus, when both the lock servo 150 and the launch servo 155 disengage the forward ends 170a, 175a of the lock plunger 170 and the launch plunger 175 away from the ball stud receiver 165, the ball stud receiver 165 may transition from the holding position and into the release position, thereby releasing the ball stud portion 12 of the UAV and causing the coil springs 145 to bias the ejector plate 120 away from the top plate 110 and into the launch position.

In some embodiments, the UAV jettison apparatus 100 may comprise a manual release mechanism for releasing or disengaging the lock plunger 170 and launch plunger 175 from the ball stud receiver 165. In this manner, a user may be able to release a UAV locked or coupled to the UAV jettison apparatus 100 without utilizing the lock servo 150 and/or launch servo arm 155a. For example, one embodiment of a manual release mechanism may be one or more rods extending to the lock plunger 170 and launch plunger 175 and accessible by the user from outside or within the payload bay 105. In particular, the rod(s) may be in physical communication with the T-handle 170b of the lock plunger 170 and T-handle 175b of the launch plunger 175 and may pull or push the T-handle 170b, 175b to retract the forward ends 170a, 175a of the lock plunger 170 and the launch plunger 175.

Finally, in some embodiments, the housing 160 may comprise contact switches, which may include: a lock plunger contact switch 187, launch plunger contact switch 189, and ejector plate contact switch 191, all of which are shown in FIG. 5. The lock plunger contact switch 187 and launch plunger contact switch 189 are preferably used to indicate whether the lock plunger 170 and launch plunger 175 are engaged with the ball stud receiver 165. In particular, the T-handles 170b, 175b of the lock plunger 170 and launch plunger 175 may be in constant contact with the lock plunger contact switch 187 and launch plunger contact switch 189, while the forward ends 170a, 175a of the lock plunger 170 and launch plunger 175 are engaged with the ball stud receiver 165. Thus, upon actuation of the lock servo arm 150a and launch servo arm 155a, the T-handles 170b, 175b of the lock plunger 170 and launch plunger 175 may be pushed outwardly, causing the forward ends 170a, 175a of the lock plunger 170 and launch plunger 175 to retract and disengage from the ball stud receiver 165. At this time, the T-handles 170b, 175b of the lock plunger 170 and launch plunger 175 preferably do not contact the lock plunger contact switch 187 and launch plunger contact switch 189, thereby terminating electrical contact at the lock plunger contact switch 187 and launch plunger contact switch 189. As a result, the lock plunger contact switch 187 and launch plunger contact switch 189 may alert the aircraft that the lock plunger 170 and launch plunger 175 are disengaged with the ball stud receiver 165. As such, these contact switches may be used as verification devices to determine whether the lock plunger 170 and launch plunger 175 are engaged with the ball stud receiver 165.

Similarly, the ejector plate contact switch 191 may be used to indicate whether the ejector plate 120 is in contact with the ejector plate contact switch 191. In particular, when the ejector plate 120 is in the stowed position, the ejector plate 120 preferably contacts the ejector plate contact switch 191, and thus, alerts the aircraft that the UAV is fully seated. As such, the ejector plate contact switch 191 may be used to verify whether the UAV is fully seated in the UAV jettison apparatus 100 and ready for launch.

In operation, a UAV may be provided for transport by a larger aircraft. The UAV being transported may first be inverted and roughly aligned with the ejector plate recesses 120a located on the ejector plate 120 and beneath the aircraft. After the feet of the UAV is aligned with the ejector plate recesses 120a (shown in FIGS. 9A to 9D), an upward force may be applied to the UAV, causing the alignment pins 420 (shown in FIG. 4) on the ejector plate 120 to slide into the ejector plate recesses 120a and provide proper alignment to the UAV. This alignment may help facilitate an electrical connection between the larger aircraft and the UAV, wherein the electrical connection may serve various applications. For example, in one embodiment, the electrical connection may be an RF connection that provides a GPS signal prior to deployment of the UAV. In another embodiment, the electrical connection may also provide an electrical power charge to the UAV.

As the upward force is applied to the UAV, the coil springs 145 surrounding the linear bearings 135 and attached to the ejector plate 120 may experience loading and thus store spring energy. Importantly, the ball stud portion 12 located beneath the UAV may contact and engage the ball stud receiver 165, causing rotational movement of the ball stud receiver 165 from a release position and to a holding position. This rotational movement of the ball stud receiver 165 may also: (1) allow the first bore 171 to align and extend across the wheel mount 160a and ball stud receiver 165 and (2) allow the second bore 176 to also align and extend across the wheel mount 160a and ball stud receiver 165. Thus, upon alignment of the first bore 171 and second bore 176, the forward end 170a of the lock plunger 170 and forward end 175a of the launch plunger 175 may engage the ball stud receiver 165, thereby locking and holding the ball stud receiver 165 to prevent further rotation. Additionally, the T-handle 170b of the lock plunger 170 and T-handle 175b of the launch plunger 175 may activate the lock plunger contact switch 187 and launch plunger contact switch 189 to verify that the lock plunger 170 and launch plunger 175 are engaged with the ball stud receiver 165. When the ejector plate 120 is fully seated with the UAV, the ejector plate contact switch 191 may also be actuated, indicating that the UAV is fully seated in the UAV jettison apparatus 100 and ready for launch.

During flight, the orientation and exposed portion of the UAV may allow various sensors and signals on the UAV to be activated (e.g., GPS signals). Thus, unlike conventional UAV transport apparatuses that enclose a UAV in its entirety and potentially impair its sensors, the UAV jettison apparatus 100 described herein may allow various sensors of a UAV to operate during flight.

Upon launch, the UAV may be released via actuation of the lock servo 150 and launch servo 155, both of which rotate the lock servo arm 150a and launch servo arm 155a. Movement of the lock servo arm 15011 and launch servo arm 155a may push the T-handles 170b, 175b of the lock plunger 170 and launch plunger 175 outwards and thus preferably disengages the lock plunger 170 and launch plunger 175 from the ball stud receiver 165. As a result, the lock plunger contact switch 187 and launch plunger contact switch 189 may alert the aircraft that the lock plunger 170 and launch plunger 175 are disengaged from the ball stud receiver 165. Importantly, the ball stud portion 12 of the UAV is preferably released from the ball stud receiver 165, and as such, the coil springs 145, which were compressed, now preferably release the loaded spring energy. This may allow biasing of the ejector plate 120, which may propel the ejector plate 120 and UAV downwards, until the stiffener 410 of the ejector plate 120 contacts the magnets 140 at the bottom of the linear bearing shafts 135. The momentum of the UAV may also cause the UAV to continue jettisoning downwards, allowing for sufficient velocity to clear the wing structure of the larger aircraft. Coupled with the coil springs 145, the magnets 140 may also keep the ejector plate 120 closed at the opening 115a of the fairing 115. Thus, the ejector plate 120 may then serve as an aerodynamic surface to minimize drag on the larger aircraft for the remainder of the flight.

Figure 2:
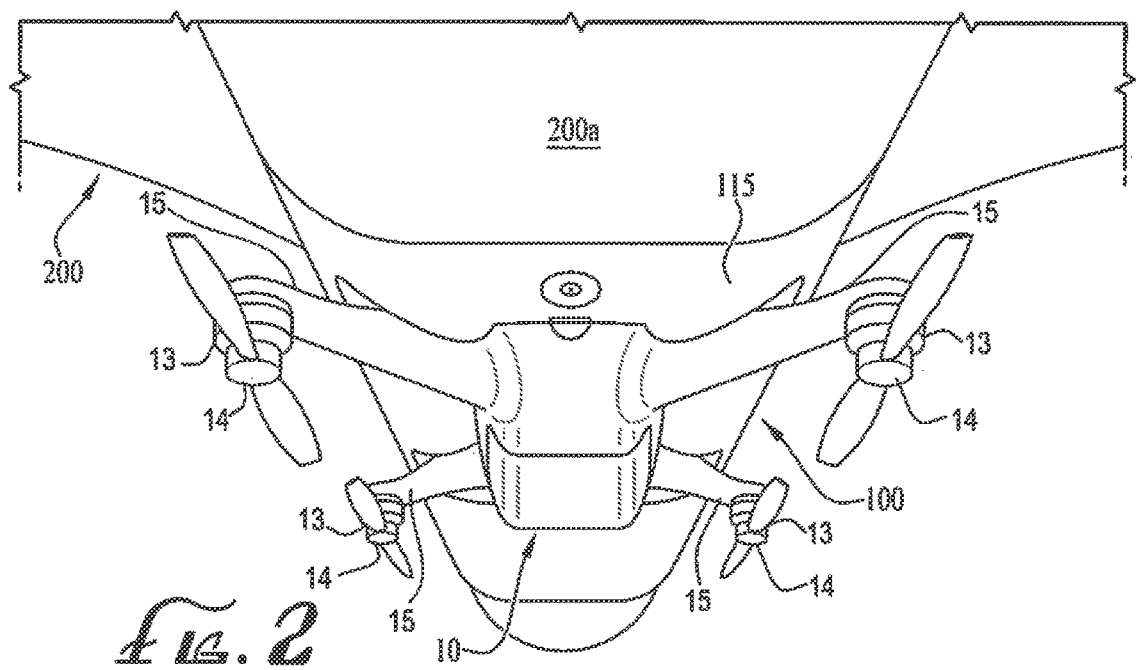
FIG. 2 is an illustration of an assembled, perspective view of one embodiment of the UAV jettison apparatus.

FIG. 2 is an illustration of an assembled, perspective view of one embodiment of the UAV jettison apparatus. As shown in FIG. 2, one embodiment of the UAV jettison apparatus 100 may be located beneath an aircraft 200 and may be integrated with the fuselage 200a of the aircraft 200. In one embodiment, the payload bay 105 may be a separate piece from the fuselage 200a of the aircraft 200 and may attach to the fuselage of the aircraft 200 for mounting of the UAV Importantly, FIG. 2 shows how the UAV 10 attaches to the UAV jettison apparatus 100. The UAV 10 may first be inverted and may have its bottom portion contact the ejector plate 120 of the UAV jettison apparatus 100. From there, upward force may be applied to the UAV 10 until the ball stud portion 12 of the UAV 10 contacts the ball stud receiver 165 of the releasable latch 130. Thus, the ball stud portion 12, which is preferably attached to the UAV 10, may couple to the UAV jettison apparatus 100, such that the UAV 10 is coupled to the UAV jettison apparatus 100 in an inverted manner.

FIG. 2 shows that use of the UAV jettison apparatus 100 and orientation of the UAV 100 allows the upper portion of the UAV 10 to be exposed. In this manner, the propellers 14 and motors 13 of the UAV 10 may be exposed to allow various UAV payloads be transported. Importantly, the exposed upper portion of the UAV 10 may allow potential sensors and transmitters to be activated during flight such as UPS signals to allow UPS tracking prior to deployment of the UAV.

Notably, FIG. 2 shows that one embodiment of the UAV 10 may be a multirotor UAV having four arm portions 15 extending outwardly and diametrically opposed. Each of the four arm portions 15 may comprise a motor 13 and corresponding propeller 14. As a result, the outer contour of the ejector fairing 405 may be generally shaped as the multirotor UAV 10, such that the ejector fairing 405 may have at least four arm portions 405a extending outwardly and diametrically, opposed (shown in FIG. 4).

Figure 3:
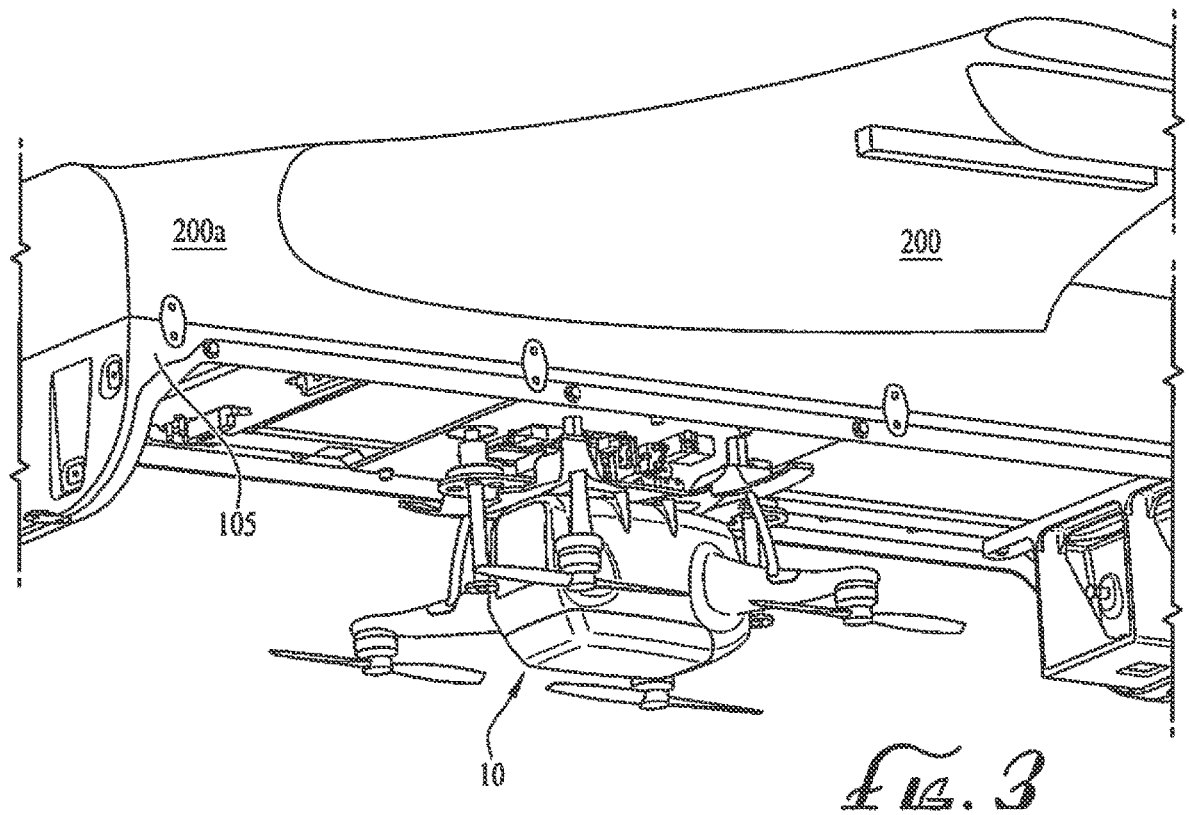
FIG. 3 is an illustration of a perspective view of one embodiment of the UAV jettison apparatus and shows the UAV jettison apparatus without a fairing.

FIG. 3 is an illustration of a perspective view of one embodiment of the UAV jettison apparatus and shows the UAV jettison apparatus without the fairing. As shown in FIG. 3, the payload bay 105 may be integrated with the fuselage of the aircraft 200. Thus, the inner space of the payload bay 105 may accommodate various types of UAVs with various payloads. FIG. 3 also shows that, when the UAV 10 contacts the ejector plate 120, the UAV 10 is preferably inverted and stowed within the inner space of the payload bay 105.

FIG. 4 is an exploded view of one embodiment of the ejector plate. As recited above, the ejector plate 120 may substantially cover the opening 115a of the fairing 115 and may be used for mounting the UAV 10 in an inverted manner. FIG. 4 shows that one embodiment of the ejector plate 120 may comprise: an ejector fairing 405, stiffener 410, linear bearings 415, alignment pins 420, linear bearing fasteners 425, and a connector 430. Similar to the fairing 115, the ejector fairing 405 may be a structure having an outer aerodynamic surface used for reducing drag. The ejector fairing 405 may also comprise ejector plate recesses 120a located beneath the ejector fairing 405 for alignment and stability when mounting the UAV 10. The stiffener 410 may be a support structure attached to a top surface of the ejector fairing 405 and may be used for strengthening and straightening the ejector fairing 405. The linear bead rigs 415 may be flanged pieces attached to the stiffener 410 via the linear bearing fasteners 425 and may be adapted to receive the linear bearing shafts 135. In this manner, the linear bearings 415 may provide free vertical movement of the ejector plate 120 along the linear bearing shafts 135. The alignment pins 420 may be used to guide the stiffener 410 and ejector fairing 405 with the UAV 10 to provide proper alignment. The connector 420 may be a component designed to provide an electrical connection to the UAV 10, such that there may be electrical communication between the aircraft 200 and UAV 10. Finally, FIG. 4 shows that the ejector fairing 405 may have at least four arm portions 405a extending outwardly and diametrically opposed, such that the outer contour of the ejector fairing 405 may accommodate a multirotor UAV 10 having four arm portions 15.

FIG. 5 is an exploded view of one embodiment of a releasable latch. As recited above, the releasable latch 130 may be one or more components configured to lock and release the ejector plate 120 from the stowed position to the launch position via the spring-loaded mechanism 125. FIG. 5 shows that one embodiment of the releasable latch 130 may comprise: lock servo 150, launch servo 155, housing 160, ball stud receiver 165, lock plunger 170, launch plunger 175, lock plunger guide 180, launch plunger guide 185, lock plunger contact switch 187, launch plunger contact switch 189, ejector plate contact switch 191, sleeve bearing 193, ball stud receiver shaft 195, and torsion spring 197.

As discussed above, the housing 160 may be a structure that holds various components of the releasable latch 130 and may include a wheel mount 160a for holding the ball stud receiver 165 in a rotating manner. The housing 160 may also comprise a first bore 171 and second bore 176 for holding the lock plunger 170 and launch plunger 175, such that the forward end 170a of the lock plunger 170 and forward end 170a of the launch plunger 175 may releasably engage the first bore 171 and/or second bore 176 of the ball stud receiver 165. The ball stud receiver 165 may be a cylindrical wheel structure used to receive, hold, and secure a ball stud portion 12 attached to the UAV 10, such that the UAV 10 may be held and secured to the UAV jettison apparatus 100. Importantly, FIG. 5 shows that the ball stud receiver 165 may fit within the wheel mount 160a of the housing 160 and may be held by the sleeve bearing 193 and ball stud receiver shaft 195. The torsion spring 197 may be coupled to the ball stud receiver shall 195 and ball stud receiver 165 in order to provide biasing to the ball stud receiver 165 in a rotating manner.

Figure 7A:
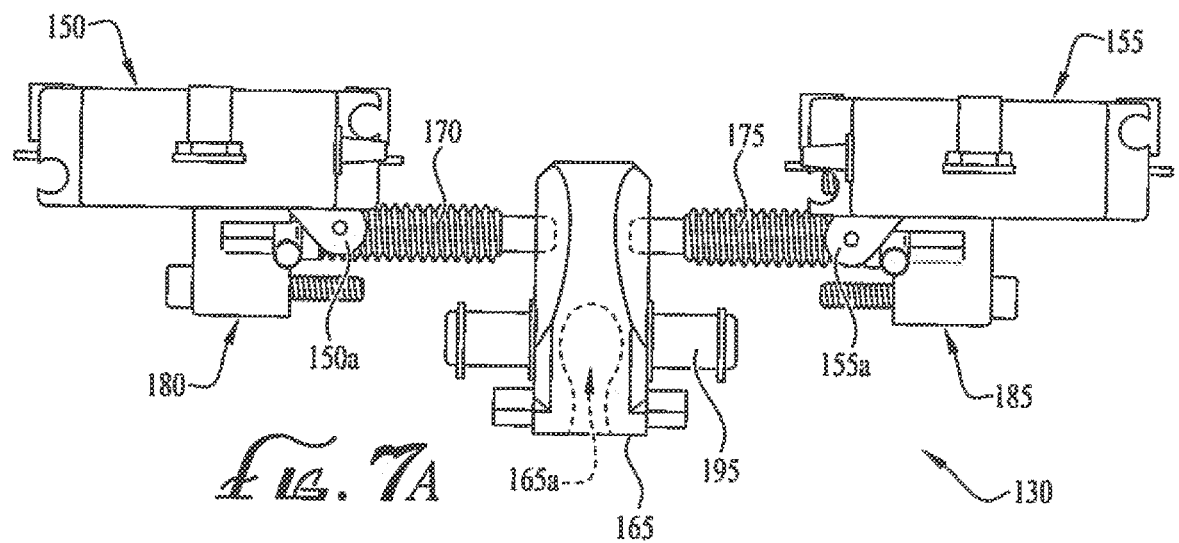
FIGS. 7A to 7C are illustrations of front elevation views of one embodiment of the releasable latch and depict the launch sequence of the releasable latch.
Figure 7B:
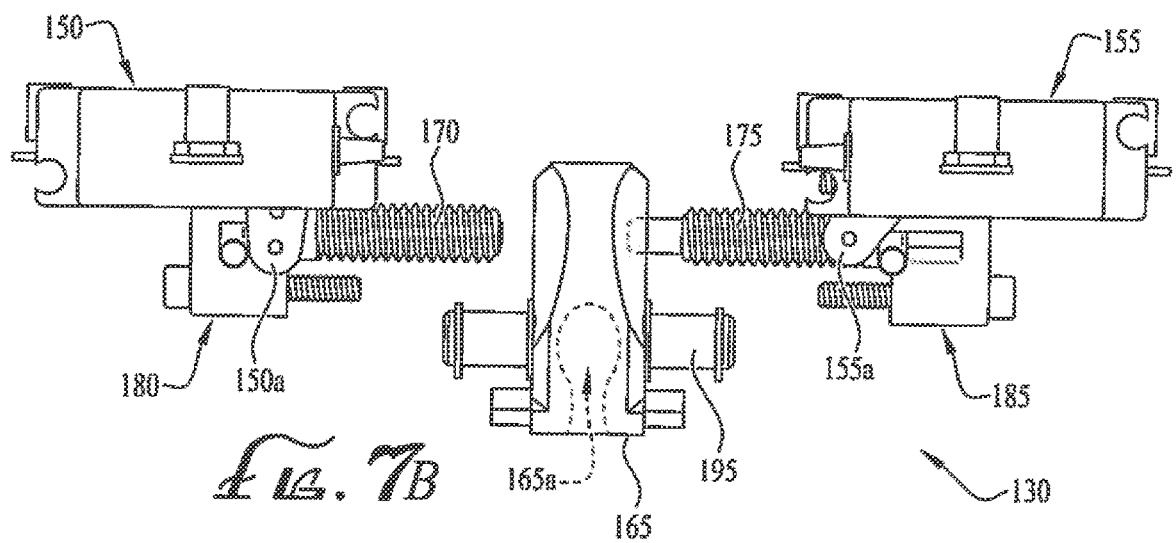
Figure 7C:
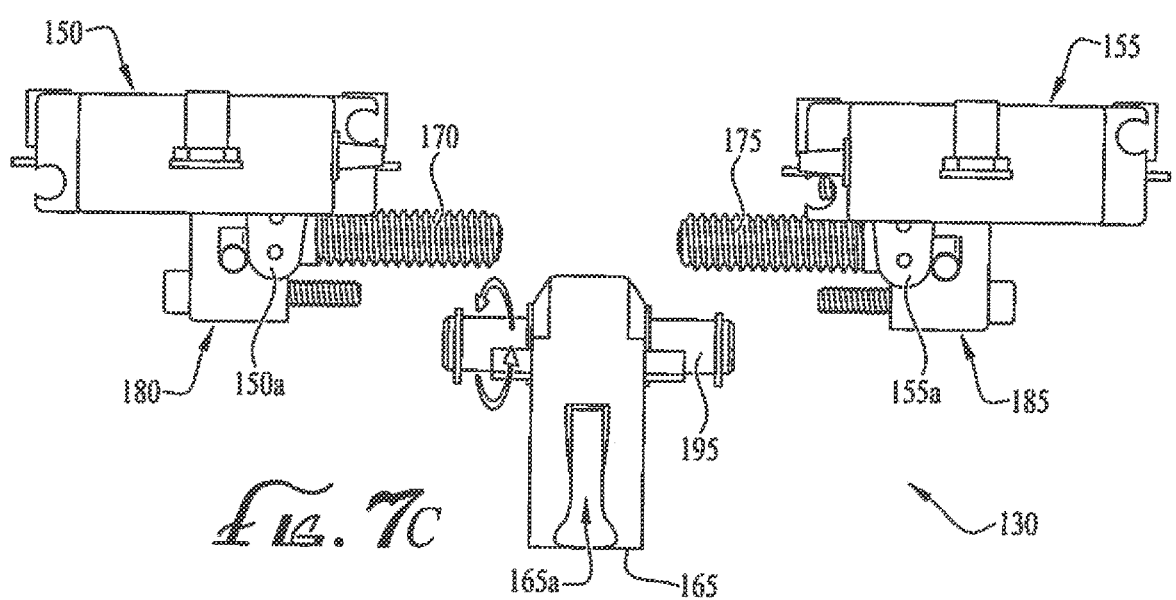

The forward end 170a of the lock plunger 170 may engage and hold the ball stud receiver 165 via the first bore 171 when the ball stud receiver 165 is rotated into the holding position. Similarly, the forward end 170a of the launch plunger 175 may likewise engage and hold the ball stud receiver 165 via the second bore 176 while the ball stud receiver 165 is in the holding position. In this manner, upon release of the forward ends 170a, 175a of the lock plunger 170 and launch plunger 175 from the ball stud receiver 165, the torsion spring 197 may bias the ball stud receiver 165 to rotate from the holding position into the release position, as shown in FIGS. 7A to 7C. As a result, the ball stud portion 12 may be released from the ball stud receiver 165, and the coil springs 145 may bias and propel the ejector plate 120 downwards (i.e., from the stowed position into the launch position), causing the UAV 10 to jettison from the aircraft 200.

In one embodiment, the diameter of the lock plunger hole 171 may be somewhat larger than the launch plunger hole 176. This may prevent inadvertent launching of the UAV in the event the launch circuit malfunctions. In particular, due to tight tolerances, the lock plunger 170 in certain instances may not engage or disengage with the lock plunger hole 171. Thus, a larger lock plunger hole 171 may allow the lock plunger 170 to somewhat move or shift, thereby assisting the lock plunger 170 to engage or disengage with the lock plunger hole 171.

As discussed above, the lock servo 150 may be a rotary actuator used for controlling the lock servo arm 150a. The lock servo arm 150a may retract the forward end 170a of the lock plunger 170, such that the forward end 170a may disengage from the ball stud receiver 165 (unlocking position). Similarly, the launch servo 155 may be a rotary actuator used for controlling the launch servo arm 155a. The launch servo arm 155a may retract the forward end 175a of the launch plunger 175, such that the forward end 175a of the launch plunger 175 may disengage from the ball stud receiver 165 (release position). The lock plunger guide 180 and launch plunger guide 185 may align and guide the lock plunger 170 and launch plunger 175 during movement via the T-handles 170b, 175b when engaging with the ball stud receiver 165.

The lock plunger contact switch 187 and launch plunger contact switch 189 are preferably electromechanical devices used for verifying that the lock plunger 170 and launch plunger 175 are engaged with the ball stud receiver 165. The ejector plate contact switch 191 may be an electromechanical device used for verifying that the ejector plate 120 is fully seated in the stowed position and ready for launch.

FIG. 6 is an assembled view of one embodiment of the releasable latch. As shown in FIG. 6, one embodiment of the releasable latch 130 may comprise: a lock servo 150, launch servo 155, housing 160, ball stud receiver 165, lock plunger 170, launch plunger 175, lock plunger guide 180, launch plunger guide 185, sleeve bearing 193, and ball stud receiver shaft 195.

FIG. 6 shows that the housing 160, lock servo 150, and launch servo 155 of the releasable latch 130 may couple or attach to the top plate 110 via screw fasteners 111, 112. Additionally, FIG. 6 shows the lock servo 150 and launch servo 155 may be respectively positioned with the first bore 171 and second bore 176 and may be adjacent to the lateral sides of the housing 160. In this manner, the housing 160 may be disposed between the lock servo 150 and launch servo 155. As a result, the lock servo 150 and launch servo 155 may retract the forward ends 170a, 175a of the lock plunger 170 and launch plunger 175 away from the ball stud receiver 165 to allow rotational movement of the ball stud receiver 165. Finally, FIG. 6 shows how the ball stud receiver 165 is coupled to the housing 160 within the wheel mount 160 in a rotating manner.

FIGS. 7A to 7C are illustrations of front elevation views of one embodiment of the releasable latch and depicts the launch sequence of the releasable latch. As shown in FIGS. 7A to 7C, one embodiment of the releasable latch 130 may comprise: a lock servo 150, launch servo 155, ball stud receiver 165, lock plunger 170, launch plunger 175, lock plunger guide 180, launch plunger guide 185, and ball stud receiver shaft 195. For ease of clarity, FIGS. 7A to 7C show the releasable latch 130 without the housing 160.

Importantly, FIGS. 7A to 7C show the launch sequence of the releasable latch 130. Specifically, FIG. 7A shows the first step of the launch sequence where the lock plunger 170 is in the locking position and where the launch plunger 175 is in the holding position. Here, the forward end 170a of the lock plunger 170 and forward end 175a of the launch plunger 175 are preferably engaged with the ball stud receiver 165 via the lock servo 150 and launch servo 155. The ball stud receiver 165 and ejector plate 120 are also both preferably in the stowed position.

FIG. 7B shows the next step of the launch sequence. Here, the lock servo 150 preferably disengages the lock plunger 170 from the ball stud receiver 165 (i.e., unlocking position). Thus, only the launch plunger 175 is engaged with the ball stud receiver 165 (i.e., holding position). At this time, the ball stud receiver 165 and ejector plate 120 are still preferably in the stowed position.

Finally, FIG. 7C shows the final step of the launch sequence. Here, the lock plunger 170 is preferably in the unlocking position, and the launch plunger 175 is preferably in the release position. Thus, the forward ends 170a, 175a of the lock plunger 170 and launch plunger 175 are preferably disengaged from the ball stud receiver 165. As a result, the ball stud receiver 165 and ejector plate 120 may transition from the stowed position to the launch position.

Figure 8C:
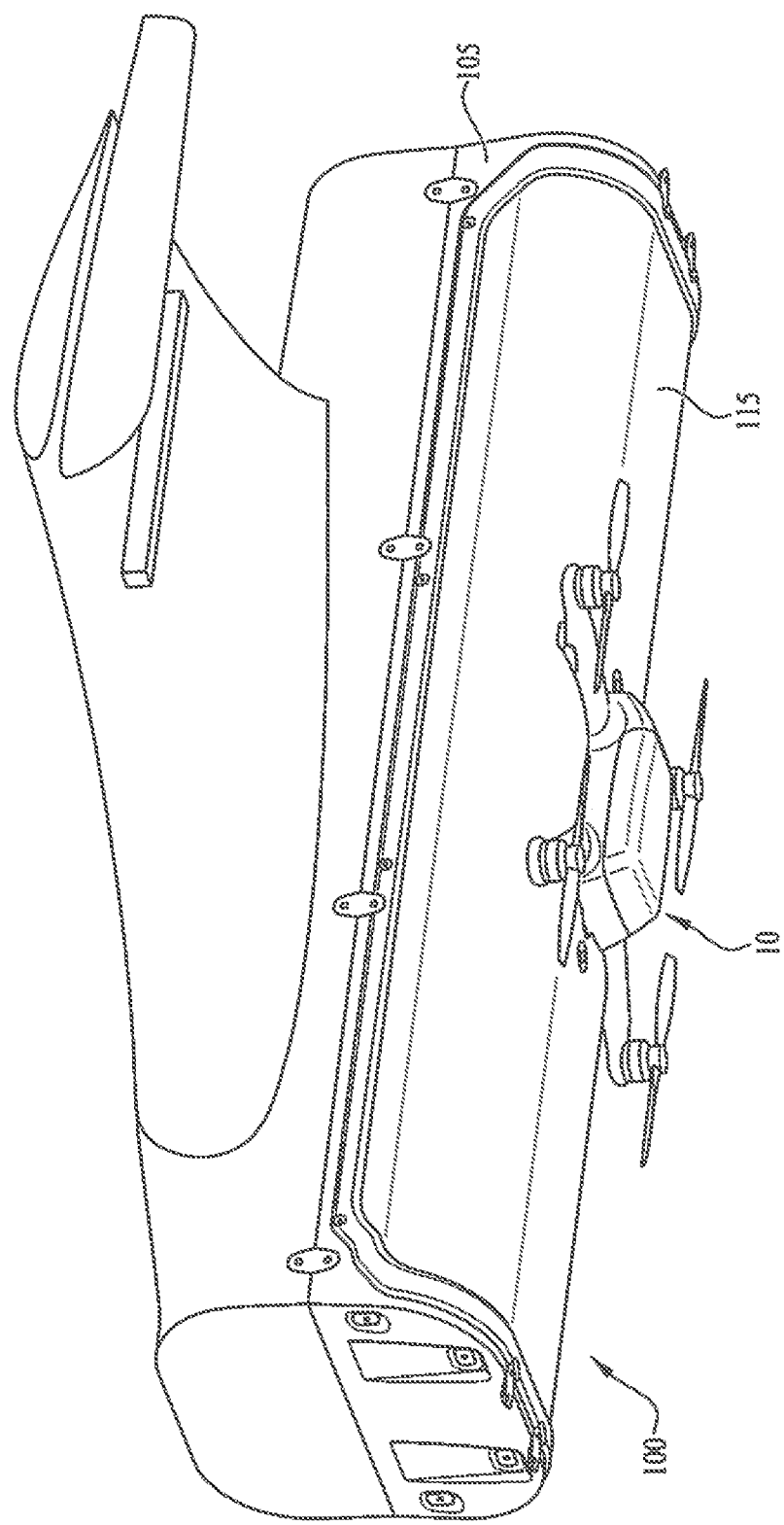

FIGS. 8A to 8C are illustrations of perspective views of one embodiment of the UAV jettison apparatus and shows the loading sequence of the UAV jettison apparatus. Specifically, FIG. 8A shows the first step of the loading sequence. Here, no UAV 10 is mounted on the UAV jettison apparatus 100, and the ejector plate 120 is preferably in the launch position. In particular, the ejector plate 120 is positioned at the bottom of the opening 115a of the fairing 115 and preferably substantially covers the opening 115a.

Next, FIG. 8B shows a UAV 10 beneath the ejector plate 120. Here, the UAV 10 is preferably inverted with its feet making contact with ejector plate 120. Preferably, the UAV 10 is inverted and aligned with the ejector plate recesses 120a of the ejector plate 120.

After the UAV 10 is inverted and aligned with the ejector plate 120, an upward force is applied to the UAV 10. As a result, the ejector plate 120 preferably transitions from the launch position to the stowed position. The ball stud portion 12 of the UAV 10 is also preferably coupled to the releasable latch 130, such that the UAV 10 is held by the UAV jettison apparatus 100.

Figure 9A:
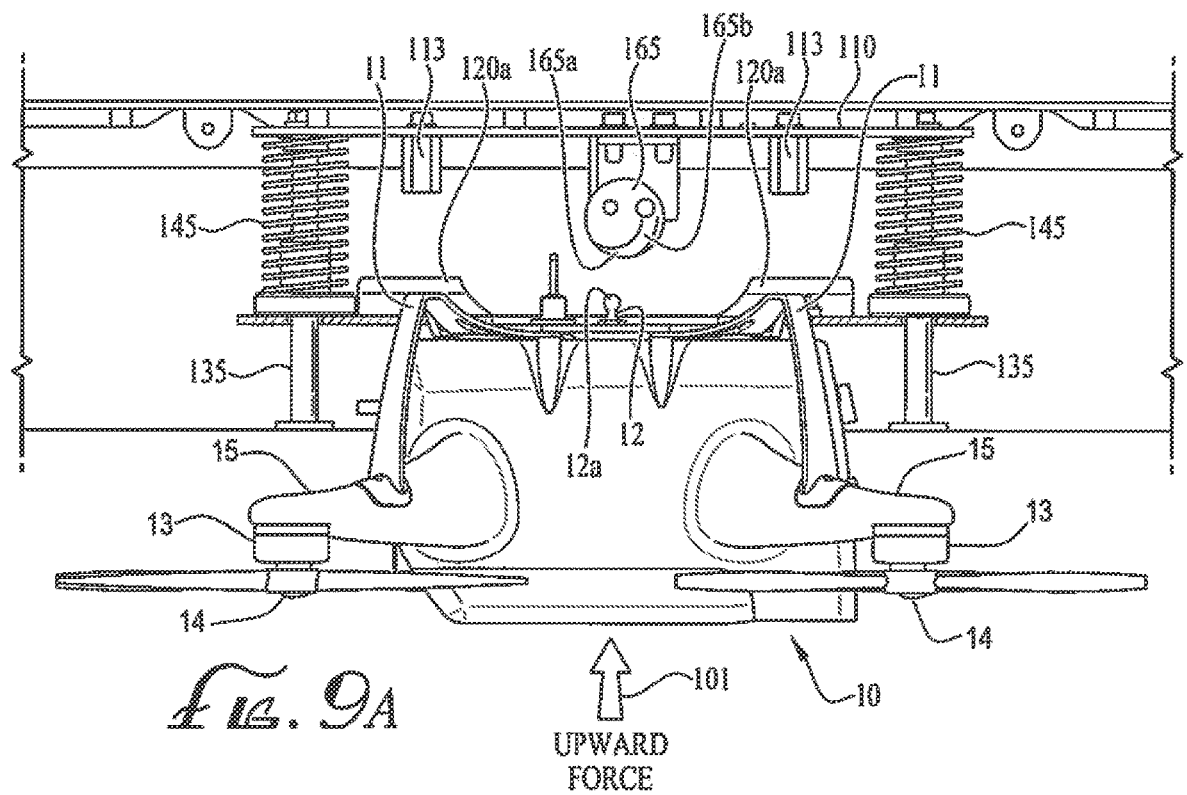
FIGS. 9A to 9O are illustrations of cross section views of one embodiment of the UAV jettison apparatus and shows the loading sequence of the UAV jettison apparatus.

FIGS. 9A to 9D are illustrations of cross section views of one embodiment of the UAV jettison apparatus and shows the loading sequence of a UAV onto the UAV jettison apparatus. Specifically, FIG. 9A shows the UAV 10 seated on the ejector plate 120. Here, the feet 11 of the UAV 10 may align with the ejector plate recesses 120a, such that the ball stud portion 12 beneath the UAV 10 may protrude through the ejector plate 120. In this manner, the ball stud portion 12 may be positioned directly beneath the ball stud receiver 165. FIG. 9A also shows that an upward force 101 may be applied against the UAV 10, causing the coil springs 145 surrounding the linear bearing shafts 135 to compress and the ejector plate 120 to move upwards towards the top plate 110.

Figure 9B:
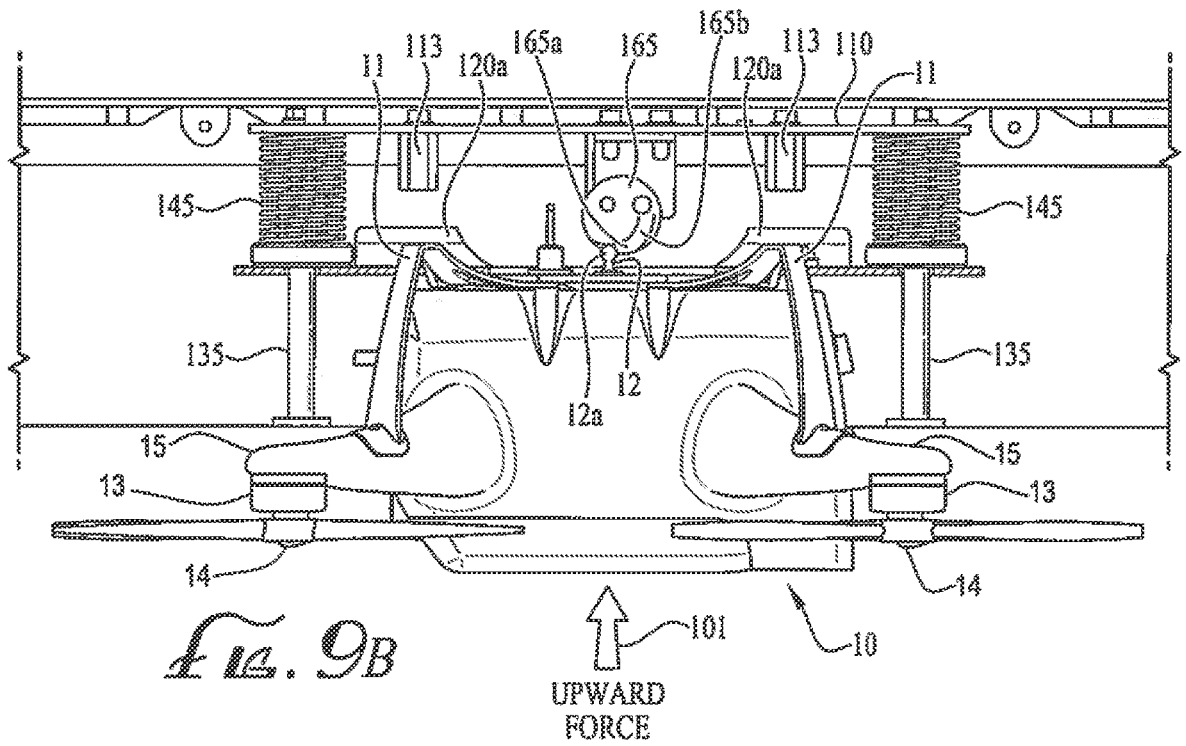

Next, FIG. 9B shows the UAV 10 and the ejector plate 120 moving closer to the top plate 110 due to the applied upward force 101. Here, the ball stud portion 12 may contact the opening 165a of the ball stud receiver 165. The ejector plate recesses 120a of the ejector plate 120 may also be positioned directly beneath the standoffs 113, such that the standoffs 113 may restrict upward movement of the ejector plate 120. FIG. 9B finally shows the coil springs 145 slightly more compressed.

Figure 9C:
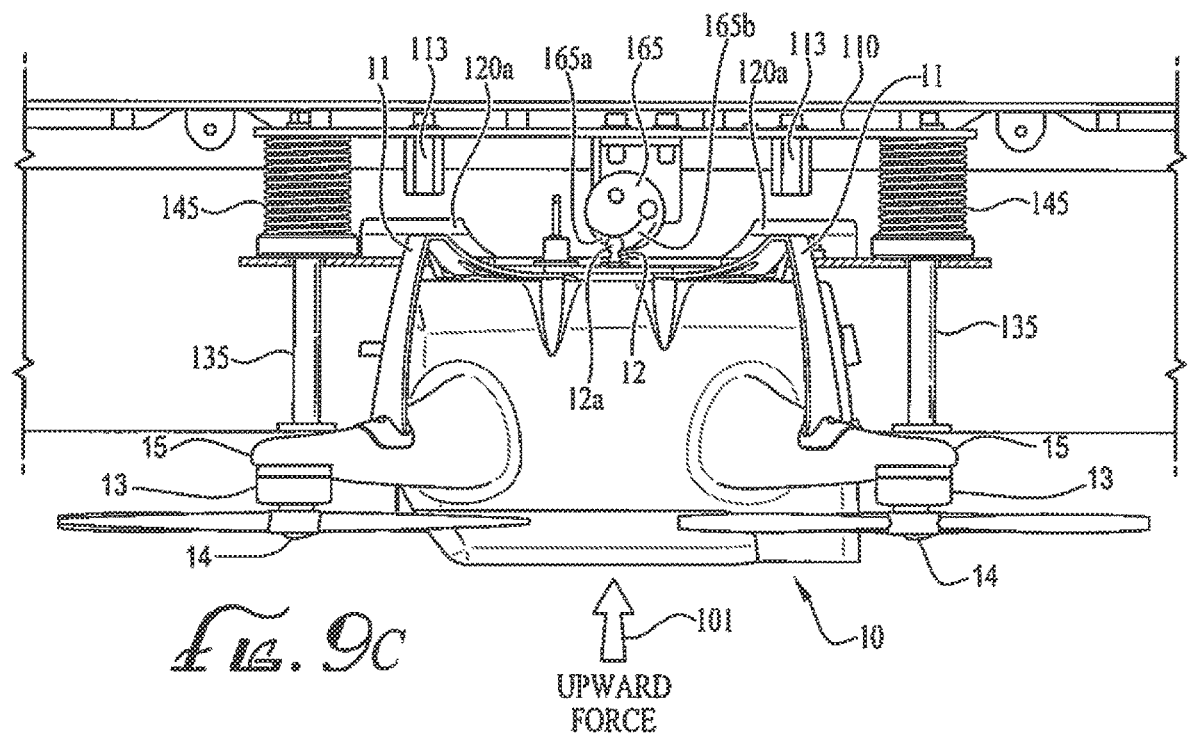

FIG. 9C shows the UAV 10 and the ejector plate 120 near the top plate 110. After additional upward force 101 is applied against the UAV 10 and ejector plate 120, the ball stud portion 12 may engage the channel 165b of the ball stud receiver 165 and may extend through the opening 165a of the ball stud receiver 165. The upper surface of the ejector plate 120 may also be directly below the standoffs 113. Finally, FIG. 9C shows the coil springs 145 surrounding the linear bearing shafts 135 almost fully compressed.

Figure 9D:
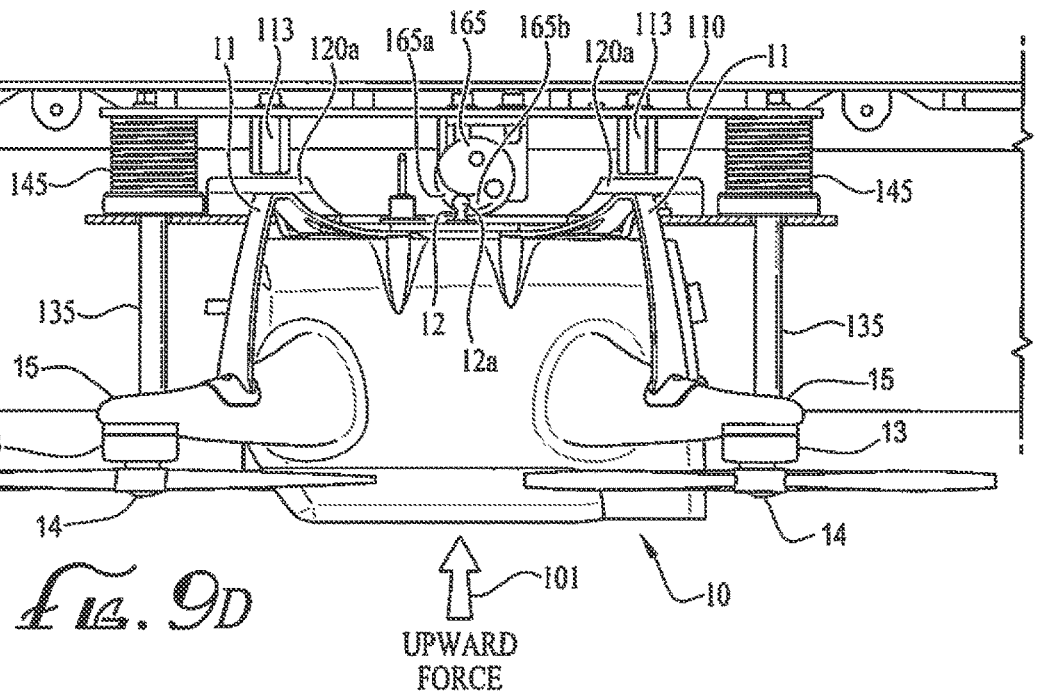

Finally, FIG. 9D shows the UAV 10 fully seated within the UAV jettison apparatus 100. Here, after applying an upward force 101 against the UAV 10, the ball stud portion 12 may be fully engaged with the channel 165b of the ball stud receiver 165. The upper surface of the ejector plate 120 may also contact the standoffs 113, and the coil springs 145 may be fully compressed. Various embodiments of the UAV 10 may also have its upper portion, including its propellers and motors, exposed outside the UAV jettison apparatus 100. Finally, some embodiments of the UAV jettison apparatus 100 may actuate an ejector plate contact switch 191, thereby alerting the aircraft 200 that the UAV 10 is fully seated within the UAV jettison apparatus 100.

FIG. 10 is a flow diagram of the loading and launch sequence for one embodiment of the UAV jettison apparatus. As shown in FIG. 10, one embodiment of the loading and launch sequence 1000 may comprise steps 1005, 1010, 1015, 1020, 1025, 1030, 1035, 1040, 1045, 1050, 1055, 1060, 1065, 1070, 1075, 1080. Steps 1005, 1010. 1015, 1020, 1025. 1030, 1035, 1040, 1045 depict the loading sequence, whereas steps 1050, 1055, 1060, 1065, 1070, 1075, 1080 depict the launch sequence. FIG. 10 shows the first step 1005 of the loading sequence, which may be aligning the feet of the UAV 10 with the ejector plate recesses 120a. As discussed above, the ejector plate 120 may comprise ejector plate recesses 120a configured to receive and contact the underlying surface of the feet 11 of the UAV 10. Thus, the UAV 10 may be inverted and roughly aligned with the ejector plate recesses 120a of the ejector plate 120. Additionally, the UAV 10 may properly align with the alignment pins 420, such that the connector 430 located on the ejector plate 120 may mate and engage with a connector located on the UAV 10 to provide electrical communication between the aircraft 200 and UAV 10. After the feet 11 of the UAV 10 is aligned with the ejector plate recesses 120a, an upward force 101 may be applied to the UAV 10 in order to push the UAV 10 upwards and towards the inner cavity of the payload bay 105 (step 1010).

As the upward force 101 is applied to the UAV 10, the UAV 10 is preferably pushed into the UAV jettison apparatus 100 for loading. Specifically, as the upward force 101 is applied to the UAV 10, the coil springs 145 may compress and the ball stud portion 12 located beneath the UAV 10 may contact the ball stud receiver 165 (steps 1015, 1020). Upon contact with the ball stud portion 12, the ball stud receiver 165 may rotate and produce an audible click (steps 1025, 1030). At this time, the lock plunger 170 and launch plunger 175 both located adjacent to the wheel mount 160a of the housing 160 may engage the ball stud receiver 165 (steps 1035, 1040). Finally, in step 1045, the ejector plate contact switch 191 may be actuated and thus send an electrical signal to the aircraft 200, indicating that the UAV 10 is fully seated within the UAV jettison apparatus 100.

FIG. 10 also shows the launch sequence of the UAV 10 in steps 1050, 1055, 1060, 1065, 1070, 1075, 1080. According to step 1050, the UAV 10 may be ready for ejection and release after the UAV 10 has been loaded to the UAV jettison apparatus 100. Upon release of the releasable latch 130, the lock servo 150 and launch servo 155 may drive the lock plunger 170 and launch plunger 175, respectively (steps 1055, 1060). As a result, the forward end 170a of the lock plunger 170 and forward end 175b of the launch plunger 175 preferably retract and disengage the ball stud receiver 165, allowing the ball stud receiver 165 to rotate from the holding position to the release position. As a result, the coil springs 145 may extend, biasing and releasing a spring force downwards against the ejector plate 120 (step 1065). The ball stud receiver 165 also preferably releases the ball stud portion 12 of the UAV 10, causing the UAV 10 to propel downwards (step 1070).

Finally, FIG. 10 shows the final steps of the launch sequence of the UAV 10. Here, after the ejector plate 120 propels and ejects the UAV 10, the ejector plate 120 preferably reaches and stops at the end of the linear bearing shafts 135 (step 1075). This may be accomplished by the use of magnets 140, which may be located at the ends of the linear bearing shafts 135. In this manner, the magnets 140 may produce a magnetic field to pull and hold the ejector plate 120 at the ends of the linear bearing shafts 135. The magnets 140 and coil springs 145 may also hold the ejector plate 120 closed against aerodynamic forces, as shown in step 1080. Although the use of magnets 140 are shown in FIG. 10, alternative embodiments of the UAV jettison apparatus 100 may lack magnets.

The foregoing description of the embodiments of the UAV jettison apparatus has been presented for the purposes of illustration and description. While multiple embodiments of the UAV jettison apparatus are disclosed, other embodiments will become apparent to those skilled in the art from the above detailed description. As will be realized, these embodiments are capable of modifications in various obvious aspects, all without departing from the spirit and scope of the present disclosure. Accordingly, the detailed description is to be regarded as illustrative in nature and not restrictive. Also, although not explicitly recited, one or more embodiments may be practiced in combination or conjunction with one another. Furthermore, the reference or non-reference to a particular embodiment shall not be interpreted to limit the scope of protection. It is intended that the scope of protection not be limited by this detailed description, but by the claims and the equivalents to the claims that are appended hereto.

Although embodiments of the UAV jettison apparatus are described in considerable detail, including references to certain versions thereof, other versions are possible such as, for example, orienting and/or attaching components in different fashion. Therefore, the spirit and scope of the appended claims should not be limited to the description of versions included herein.

Except as stated immediately above, nothing which has been stated or illustrated is intended or should be interpreted to cause a dedication of any component, step, feature, object, benefit; advantage, or equivalent to the public, regardless of whether it is or is not recited in the claims. The scope of protection is limited solely by the claims that now follow, and that scope is intended to be broad as is reasonably consistent with the language that is used in the claims. The scope of protection is also intended to be broad to encompass all structural and functional equivalents.

What is claimed as new and desired to be protected by Letters Patent is set forth in the appended claims:

1. An unmanned aerial vehicle (UAV) jettison apparatus, comprising:
   a payload bay mounted beneath an aircraft and having an inner space and a top plate attached therewith;
   a fairing substantially covering said inner space of said payload bay and having an opening positioned directly below said top plate;

an ejector plate substantially covering said opening and adapted for inverted mounting and launching of a UAV, said ejector plate comprising:
  an ejector fairing;
  a stiffener attached to a top surface of said ejector fairing; and
  one or more linear bearings attached to said stiffener;
a spring-loaded mechanism for launching said ejector plate downwards from a stowed position to a launch position and comprising: one or more coil springs and one or more linear bearing shafts; and
a releasable latch configured to hold and lock said ejector plate at said stowed position, such that upon release of said releasable latch, said one or more coil springs bias said ejector plate downwards and away from said top plate to said launch position;
wherein said UAV is a multirotor UAV having at least four arm portions extending outwardly and diametrically opposed, each of said at least four arm portions comprising a motor and corresponding propeller; and
wherein an outer contour of said ejector fairing is generally shaped as said multirotor UAV, such that said ejector fairing has at least four arm portions extending outwardly and diametrically opposed.

2. The UAV jettison apparatus according to claim 1, wherein said opening of said fairing is generally shaped as said outer contour of said ejector fairing and said UAV.

3. The UAV jettison apparatus according to claim 2, wherein said UAV comprises a ball stud portion located beneath said UAV, said ball stud portion having a ball and a post; and
  wherein said releasable latch comprises:
    a ball stud receiver having an opening sized to receive said ball stud portion and a channel adapted to retain said ball with said post extending through said opening, said channel being radially formed inwards from said opening, wherein said ball stud receiver is substantially circular in shape;
    a housing having a wheel mount formed therein for rotatably coupling said ball stud receiver around an axis and a torsion spring for biasing a rotation of said ball stud receiver away from a holding position, said housing having a first bore extending through said wheel mount and said ball stud receiver when said ball stud receiver is rotated to said holding position;
    a lock plunger disposed in said housing and having a forward end adapted to moveably engage said ball stud receiver via said first bore when said ball stud receiver is in said holding position; and
    a lock servo for driving said forward end of said lock plunger away from said ball stud receiver, such that said forward end of said lock plunger disengages said ball stud receiver.

4. The UAV jettison apparatus according to claim 3, wherein said housing further comprises a second bore extending through said wheel mount and said ball stud receiver when said ball stud receiver is rotated into said holding position; and
  wherein said releasable latch further comprises:
    a launch plunger disposed in said housing and having a forward end adapted to moveably engage said ball stud receiver via said second bore when said ball stud receiver is in said holding position; and
    a launch servo for driving said forward end of said launch plunger away from said ball stud receiver such that, said forward end of said launch plunger disengages said ball stud receiver;
    wherein, when said forward ends of said lock plunger and said launch plunger disengage said ball stud receiver, said ball stud receiver rotates from said holding position to a release position, thereby releasing said ball stud portion and causing said one or more coil springs to bias said ejector plate away from said top plate to said launch position.

5. The UAV jettison apparatus according to claim 4, wherein said ejector plate further comprises a connector adapted to electrically couple said UAV when said UAV is mounted on said ejector plate in an inverted manner.

6. A UAV jettison apparatus, comprising:
  a payload bay mounted beneath an aircraft when said aircraft is in a horizontal flight orientation and having an inner space and a top plate attached therewith;
  a fairing substantially covering said inner space of said payload bay and having an opening positioned directly below said top plate, said opening being sized to fit at least a bottom portion of a UAV;
  an ejector plate substantially covering said opening and adapted for inverted mounting and launching of said UAV;
  a spring-loaded mechanism for launching said ejector plate downwards from a stowed position to a launch position and comprising:
    one or more linear bearing shafts extending downwards from said top plate and adapted to guide said ejector plate vertically between said stowed position and said launch position;
    one or more coil springs for exerting a spring-loaded force on said ejector plate, said one or more coil springs surrounding said one or more linear bearing shafts and disposed between said top plate and said ejector plate; and
  a releasable latch disposed between said top plate and said ejector plate and configured to lock and hold said UAV at said stowed position, such that upon release of said releasable latch, said one or more coil springs bias said ejector plate away from said top plate to said launch position;
  wherein said UAV is a multirotor UAV having at least four arm portions extending outwardly and diametrically opposed; and
  wherein each of said at least four arm portions comprises a motor and corresponding propeller.

7. The UAV jettison apparatus according to claim 6, wherein said ejector plate comprises:
  an ejector fairing generally shaped as an outer contour of said UAV;
  a stiffener attached to a top surface of said ejector fairing; and
  one or more linear bearings attached to said stiffener and adapted to move along said one or more linear bearing shafts.

8. The UAV jettison apparatus according to claim 7, wherein said UAV comprises a ball stud portion located beneath said UAV, said ball stud portion having a ball and a post; and
  wherein said releasable latch comprises:
    a ball stud receiver having an opening sized to receive said ball stud portion and a channel adapted to retain said ball with said post extending through said opening, said channel being radially formed inward from said opening, wherein said ball stud receiver is substantially circular in shape;
    a housing having a wheel mount formed therein for rotatably coupling said ball stud receiver around an axis and a torsion spring for biasing a rotation of said ball stud receiver away from a holding position, said housing having a first bore extending through said wheel mount and said ball stud receiver when said ball stud receiver is rotated to said holding position;

a lock plunger disposed in said housing and having a forward end adapted to moveably engage said ball stud receiver via said first bore when said ball stud receiver is in said holding position; and a lock servo for driving said forward end of said lock plunger away from said ball stud receiver, such that said forward end of said lock plunger disengages said ball stud receiver.

9. The UAV jettison apparatus according to claim 8, wherein said housing further comprises a second bore extending through said wheel mount and said ball stud receiver when said ball stud receiver is rotated into said holding position; and wherein said releasable latch further comprises:
a launch plunger disposed in said housing and having a forward end adapted to moveably engage said ball stud receiver via said second bore when said ball stud receiver is in said holding position; and a launch servo for driving said forward end of said launch plunger away from said ball stud receiver such that, said forward end of said launch plunger disengages said ball stud receiver;

wherein, when said forward ends of said lock plunger and said launch plunger disengage said ball stud receiver, said ball stud receiver rotates from said holding position to a release position, thereby releasing said ball stud portion and causing said one or more coil springs to bias said ejector plate downwards and away from said top plate to said launch position.

10. The UAV jettison apparatus according to claim 9, wherein said ejector plate further comprises a connector adapted to electrically couple said UAV when said UAV is mounted on said ejector plate in an inverted manner; and wherein said connector provides electric communication between said UAV and said aircraft.

11. The UAV jettison apparatus according to claim 10, wherein said aircraft is a UAV generally larger than said multirotor UAV.

12. A UAV jettison apparatus, comprising:
a payload bay mounted beneath a first UAV when said first UAV is in a horizontal flight orientation and having an inner space and a top plate attached therewith;

a fairing substantially covering said inner space of said payload bay and having an opening positioned directly below said top plate, said opening being sized to fit at least a bottom portion of a second UAV;

an ejector plate substantially covering said opening and adapted for inverted mounting of said second UAV having a ball stud portion, said ball stud portion having a ball and a post, and wherein said ejector plate comprises:
an ejector fairing having an outer contour with at least four arm portions extending outwardly and diametrically opposed;
a stiffener attached to a top surface of said ejector fairing; and
one or more linear bearings attached to said stiffener and adapted to move along said one or more linear bearing shafts;

a spring-loaded mechanism for launching said ejector plate downwards from a stowed position to a launch position and comprising:
one or more linear bearing shafts extending downwards from said top plate and adapted to guide said ejector plate vertically between said stowed position and said launch position; and
one or more coil springs surrounding said one or more linear bearing shafts, said one or more coil springs being disposed between said top plate and said ejector plate and adapted to exert a spring-loaded force on said ejector plate; and a releasable latch disposed between said top plate and said ejector plate and configured to releasably lock and hold said second UAV at said stowed position, such that upon release of said releasable latch, said one or more coil springs bias said ejector plate downwards and away from said top plate and to said launch position, said releasable latch comprising:
a ball stud receiver having an opening sized to receive said ball stud portion and a channel adapted to retain said ball with said post extending through said opening, said channel being radially formed inward from said opening, wherein said ball stud receiver is substantially circular in shape;
a housing having a wheel mount formed therein for rotatably coupling said ball stud receiver around an axis and a torsion spring for biasing a rotation of said ball stud receiver away from a holding position, said housing having a first bore extending through said wheel mount and said ball stud receiver when said ball stud receiver is rotated to said holding position;
a lock plunger disposed in said housing and having a forward end adapted to moveably engage said ball stud receiver via said first bore when said ball stud receiver is in said holding position; and
a lock servo for driving said forward end of said lock plunger away from said ball stud receiver, such that said forward end of said lock plunger disengages said ball stud receiver.

13. The UAV jettison apparatus according to claim 12, wherein said opening of said fairing is generally shaped as said outer contour of said ejector fairing.

14. The UAV jettison apparatus according to claim 13, wherein said housing further comprises a second bore extending through said wheel mount and said ball stud receiver when said ball stud receiver is rotated into said holding position; and wherein said releasable latch further comprises:
a launch plunger disposed in said housing and having a forward end adapted to moveably engage said ball stud receiver via said second bore when said ball stud receiver is in said holding position; and
a launch servo for driving said forward end of said launch plunger away from said ball stud receiver such that, said forward end of said launch plunger disengages said ball stud receiver;
wherein, when said forward ends of said lock plunger and said launch plunger disengage said ball stud receiver, said ball stud receiver rotates from said holding position to a release position, thereby releasing said ball stud portion and causing said one or more coil springs to bias said ejector plate downwards and away from said top plate to said launch position.

15. The UAV jettison apparatus according to claim 14, wherein said ejector plate further comprises a connector adapted to electrically couple said second UAV when said second UAV is mounted on said ejector plate in an inverted manner; and wherein said connector provides electric communication between said first UAV and said second UAV.

16. The UAV jettison apparatus according to claim 15, wherein said first UAV is a fixed winged aircraft; and wherein said second UAV is a multirotor UAV.

* * * * *